(12) United States Patent
Fukuda et al.

(10) Patent No.: US 6,278,490 B1
(45) Date of Patent: Aug. 21, 2001

(54) EXPOSURE CONTROL FOR AN IMAGE PICKUP APPARATUS THAT USES AN ELECTRONIC FLASH

(75) Inventors: Hidetoshi Fukuda, Yokohama; Minoru Kakinuma; Osamu Inagaki, both of Hachioji; Gakuji Kamishima, Hino, all of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 08/859,678

(22) Filed: May 20, 1997

(30) Foreign Application Priority Data

May 23, 1996 (JP) .................................... 8-128392
Jun. 6, 1996 (JP) .................................... 8-144249

(51) Int. Cl.[7] .............................. G03B 7/00; H04N 5/222
(52) U.S. Cl. .......................... 348/362; 348/370; 348/371
(58) Field of Search ................................... 348/227, 228, 348/229, 230, 241, 362, 371, 370, 294, 68, 220, 302, 303, 304, 297; 358/475; 235/462.06

(56) References Cited

U.S. PATENT DOCUMENTS

| | | | |
|---|---|---|---|
| 3,577,153 | * 5/1971 | Yagi et al. ............................. | 178/6.8 |
| 4,647,975 | * 3/1987 | Alston et al. ......................... | 358/213 |
| 5,229,856 | * 7/1993 | Koshiishi ............................. | 348/312 |
| 5,264,940 | * 11/1993 | Koyima et al. ...................... | 358/228 |
| 5,264,944 | * 11/1993 | Takemura ............................. | 358/335 |
| 5,331,949 | * 7/1994 | Funakoshi et al. .................... | 128/6 |
| 5,420,635 | * 5/1995 | Konishe et al. ...................... | 348/371 |
| 5,436,662 | 7/1995 | Nagasaki et al. ..................... | 348/312 |
| 5,808,681 | * 9/1998 | Kitajima .............................. | 348/371 |

FOREIGN PATENT DOCUMENTS

| | | | |
|---|---|---|---|
| 5-308573 | 11/1993 | (JP) | H04N/5/335 |
| 7-38815 | 2/1995 | (JP) | H04N/5/335 |

* cited by examiner

Primary Examiner—Wendy R. Garber
Assistant Examiner—Luong Nguyen
(74) Attorney, Agent, or Firm—Frishauf, Holtz, Goodman, Langer & Chick, P.C.

(57) ABSTRACT

An image pickup apparatus including a solid-state image pickup device for photoelectrically converting incident light from an object into an electrical signal and outputting the electrical signal, an electronic flash tube for irradiating light onto the object, and a system controller for controlling the light emission timing of the electronic flash tube. The electronic flash tube is caused to emit light in the vertical blanking period of the solid-state image pickup device. The invention is to also provide an image pickup apparatus having a solid-state image pickup device capable of performing photoelectric conversion and reading out the charges accumulated for an arbitrary time, a field memory for storing image data obtained by performing predetermined processing for the readout signal, an image synthesizing unit for synthesizing an immediately preceding field image and a new image from the image pickup device, and an electronic flash unit. Even when the image is picked up using short-time light emission of the electronic flash unit or the like, two images with different exposure amounts are obtained and synthesized to generate an image having an appropriate and wide dynamic range.

22 Claims, 19 Drawing Sheets

EXPOSURE CONTROL FOR AN IMAGE PICKUP APPARATUS THAT USES AN ELECTRONIC FLASH

BACKGROUND OF THE INVENTION

The present invention relates to an image pickup apparatus or an image sensing apparatus which uses a solid-state image pickup device having a widened the dynamic range.

It has been conventionally desired to broaden the dynamic range of a solid-state image pickup device, and various technique have been proposed for that purpose.

For example, Jpn. Pat. Appln. KOKAI Publication No. 5-308573 filed by the present inventor discloses a technique associated with an image pickup apparatus using an X-Y address type solid-state image pickup device (CMD: Charge Modulation Device) in which the integration time is controlled to read out two frames with different exposure amounts, and a correction means for correcting an image is used to widen the dynamic range.

Jpn. Pat. Appln. KOKAI Publication No. 7-38815 filed by the present inventor discloses a technique associated with a CMD, in which a read is performed twice during the horizontal period, thereby independently obtaining two pixel signals with different exposure times in one frame period.

FIG. 11 is a view showing the concept of the CMD.

Referring to FIG. 11, reference numeral 51 denotes a vertical scanning circuit; 52, a horizontal scanning circuit, and 53, a light-receiving unit in which photoelectric conversion devices are two-dimensionally arrayed as pixels.

The operation of the vertical scanning circuit 51 will be described with reference to the timing chart in FIG. 12. The vertical scanning circuit 51 sequentially applies a read voltage VRD to the first to nth lines within the vertical effective period of an image. Next, the horizontal scanning circuit 52 sequentially outputs a selection pulse, and a signal is sequentially read out from a pixel of a line applied with this voltage. A reset voltage VRS is applied to the line from which one line signal is completely read out. The charges accumulated in the pixel of the line applied with the reset voltage are reset, and the pixel is exposed until the next read period. This operation is repeated for the first to nth lines, thereby reading out one frame signal. Note that VOF represents an overflow voltage. By applying the overflow voltage VOF during the horizontal blanking period, unwanted holes for the signal are cleared.

In the X-Y address type solid-state image pickup device, signals are read out in this way, and the exposure timing shifts in units of lines, as shown in FIG. 13, on the basis of the vertical focal plane scheme.

However, for the image pickup apparatus disclosed in Jpn. Pat. Appln. KOKAI Publication No. 5-308573, the operation in use of a light source such as an electronic flash unit is not described.

As shown in FIG. 14, an electronic flash tube 20 has light-emitting characteristics in which the light amount reaches its maximum value at the initial stage of rising immediately after light emission and then attenuates. The light emission time is short relative to the video rate (a period when the image pickup device scans an image formed on the surface of the image pickup device and outputs one frame signal as a video signal). For this reason, when a short-time light-emitting means such as an electronic flash unit is used, the region actually exposed is not certain, and one frame may be only partially exposed.

In the image pickup apparatus described in Jpn. Pat. Appln. KOKAI Publication No. 5-308573, an image having a wider dynamic range is synthesized from two frames with different exposure amounts by an image correction means, and the integration time is controlled to obtain the two frames with different exposure amounts. When the exposure amount is proportional to the integration time, no problem is posed. However, when s short-time light-emitting means such as an electronic flash unit is used, the exposure amount is not proportional to the exposure time. For this reason, the image is not appropriately corrected by the image correction means.

In the image pickup device described in Jpn. Pat. Appln. KOKAI Publication No. 7-38815 as well, the exposure period is controlled to obtain frames with different exposure amounts. In this case as well, when the exposure amount is proportional to the integration time, no problem is posed. However, when a short-time light-emitting means such as an electronic flash unit is used, the exposure amount is not proportional to the exposure time. For this reason, images with different exposure amounts cannot be appropriately obtained.

The means for synthesizing an image with a wider dynamic range from two frames with different exposure amounts performs synthesis using the ratio of exposure amounts between the two frames. When the ratio of exposure amounts has a predetermined value, image synthesis is properly performed (the specific synthesizing method is described in detail in the above prior art). In the normal operation, images with different exposure amounts are obtained by controlling the exposure period. With this method, the ratio of exposure amounts is kept constant. However, the light-emitting means such as an electronic flash unit has variations in light emission amount due to variations in charge voltage or the like. For this reason, errors are generated in image synthesis by the image synthesizing means, resulting in a degradation in image quality.

The above-described Jpn. Pat. Appln. KOKAI Publication No. 5-308573 filed by the present inventor discloses an image pickup apparatus using an X-Y address type solid-state image pickup device, in which the integration time, i.e., the exposure time for accumulating charges is controlled to read out two images with different exposure amounts, and these two images are synthesized to broaden the dynamic range.

In the image pickup apparatus described in Jpn. Pat. Appln. KOKAI Publication No. 5-308573, the exposure time is controlled to obtain two images with different exposure amounts as synthesis targets. However, no consideration is given to measures which may be come necessary in use of a light source such as an electronic flash unit.

That is, the image pickup apparatuses described in the prior arts only control the exposure time to obtain two images with different exposure amounts. Such a technique poses no problem when the exposure amount is proportional to the exposure time in, e.g., an image pickup operation based on a light source such as natural light or an illumination lamp. However, when a flash for emitting light for a short time, e.g., an electronic flash unit is used as a light source, the exposure amounts of two images are not proportional to the exposure time, and the exposure amount of the short-time light emission predominantly determines the total light amount. Even when the picked up images are synthesized simply with reference to the exposure time, the images are not appropriately synthesized for the purpose of widening the dynamic range by covering the corresponding luminance level ranges by images with different exposure amounts.

In addition, if the object moves in the composition during the light-emitting interval, the two images shift from each other upon image synthesis processing.

BRIEF SUMMARY OF THE INVENTION

The present invention has been made in consideration of the above problems, and has as its object to provide an image pickup apparatus which can obtain an appropriate image even in use of an X-Y address type solid-state image pickup device and a light-emitting means and also obtain an image having a minimum shift due to image synthesis and an appropriate and wide dynamic range by image pickup processing using, as a light source, natural light or short-time light emission (flash) of an electronic flash unit or the like.

In order to achieve the above object, according to the first aspect of the present invention, there is provided an image pickup apparatus comprising a solid-state image pickup device for photoelectrically converting incident light from an object into an electrical signal and outputting the electrical signal, an electronic flash tube for irradiating light onto the object, and control means for causing the electronic flash tube to emit light in a vertical blanking period of the solid-state image pickup device.

According to the second aspect, there is provided an image pickup apparatus comprising a solid-state image pickup device for photoelectrically converting incident light from an object into an electrical signal and outputting the electrical signal, an electronic flash tube for irradiating light onto the object, control means for causing the electronic flash tube to emit light in vertical blanking periods of different field periods of the solid-state image pickup device in different light emission amounts, and synthesizing means for synthesizing a plurality of images obtained by exposure based on light emission of the electronic flash tube.

According to the third aspect, there is provided an image pickup apparatus comprising a solid-state image pickup device capable of nondestructively reading out an image signal, an electronic flash tube for irradiating light onto an object, first control means for accumulating a signal for the solid-state image pickup device for a first accumulation time and thereafter nondestructively reading out the signal to obtain a first signal, second control means for accumulating a signal for a second accumulation time longer than the first accumulation time and thereafter reading out the signal to obtain a second image signal, and third control means for causing the electronic flash tube to emit light at an interval equal to or shorter than the first accumulation time.

According to the fourth aspect, there is provided an image pickup apparatus comprising an image pickup device for obtaining an image signal corresponding to a self image pickup field, exposure time control means for controlling an effective exposure time for the image pickup device to give effective exposure to the image pickup device during a relatively long first time interval so as to pick up an image of a portion having a relatively low luminance in the image pickup field, and to give effective exposure to the image pickup device during a relatively short second time interval adjacent so as to the first time interval to pick up an image of a portion having a relatively high luminance in the image pickup field, synthesizing means for synthesizing image data representing one image on the basis of first image signal data and second image signal data so as to represent the image of the portion having the relatively low luminance on the basis of the first image signal data obtained in correspondence with the first time interval for the image pickup device, and to represent the image of the portion having the relatively high luminance on the basis of the second image signal data obtained in correspondence with the second time interval, flash light-emitting means capable of controlling a light emission form, and light emission control means for controlling the light emission form of the flash light-emitting means to prevent a total exposure amount in the second time interval from exceeding that in the first time interval when the flash light-emitting means is caused to emit light for the first and second time intervals.

According to the fifth aspect, the light emission control means controls the light emission form so as to select a ratio of light emission amounts between light emission of the flash light-emitting means in the first time interval and that in the second time interval in correspondence with a ratio of the first time interval to the second time interval. Alternatively, the light emission control means controls an exposure amount of light emission by controlling a light emission amount per unit time for each light emission of the flash light-emitting means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention and together with the general description given above and the detailed description of the preferred embodiments given below, serve to explain the principles of the invention.

DETAILED DESCRIPTION OF THE INVENTION

The embodiments of the present invention will be described below with reference to the accompanying drawing.

Figure 1:
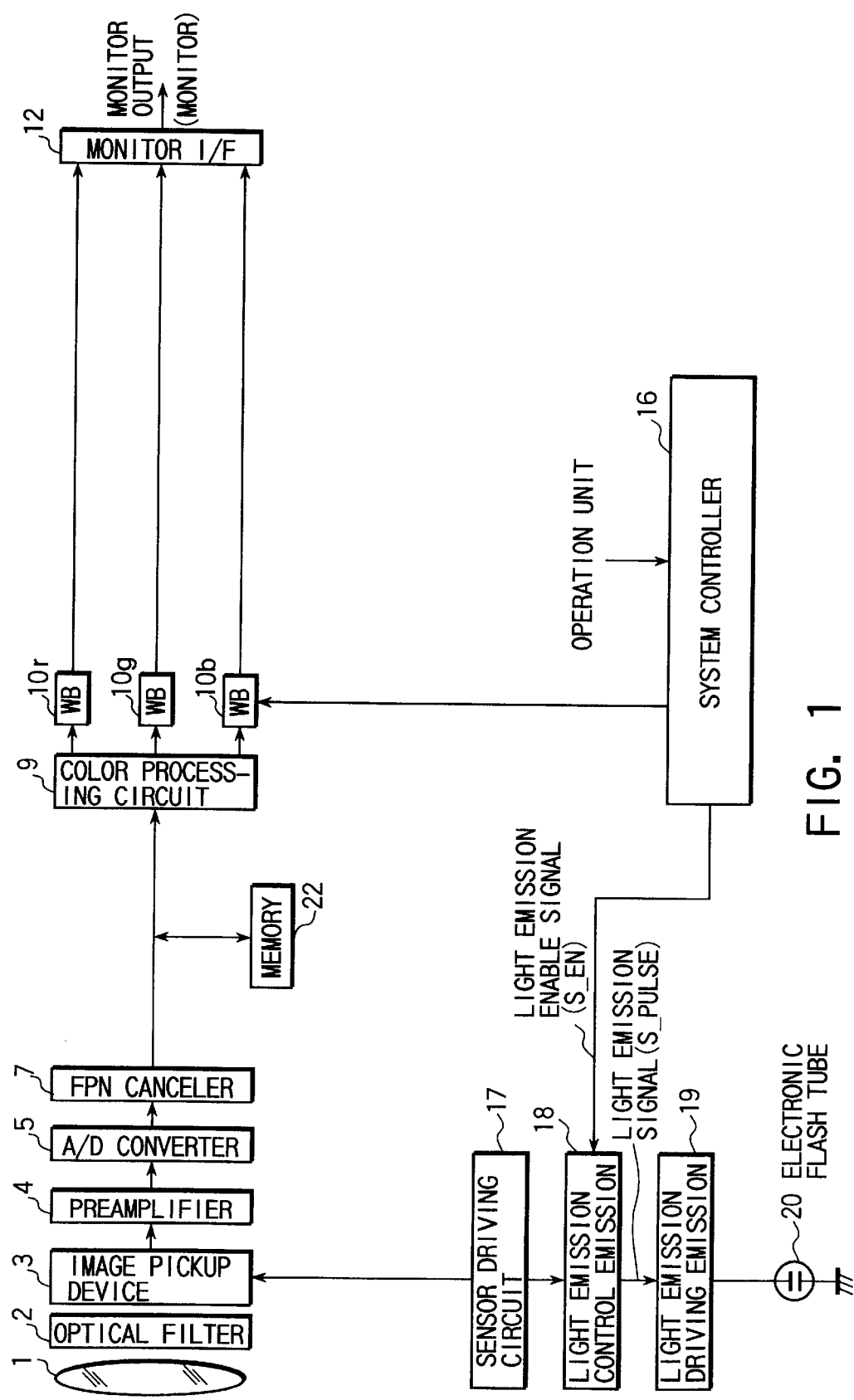
FIG. 1 is a block diagram showing the arrangement of an image pickup apparatus according to the first embodiment.

FIG. 1 is a block diagram showing the arrangement of an image pickup apparatus according to the first embodiment of the present invention.

As shown in FIG. 1, a lens 1 is arranged to image the object light on the surface of an image pickup device or image sensor 3. An optical filter 2 is arranged on the optical path between the lens 1 and the image pickup device 3. This optical filter 2 is constituted by an optical LPF (Low Pass Filter) for removing unwanted high-frequency components from the object light and an IR (Infrared Radiation) cut filter for removing unwanted infrared components from the object light. The image pickup device 3 photoelectrically converts light incident through the lens 1 and the optical filter 2 and outputs an electrical signal. In this embodiment, on-chip color filters are arranged on the surface of the image pickup device 3.

The output from the image pickup device 3 is connected to a fixed pattern noise (FPN) canceler 7 through a preamplifier 4 and an A/D converter 5. The preamplifier 4 amplifies the signal from the image pickup device 3 and performs optical black (OB) clamp processing to adjust the signal level in accordance with the input level of the subsequent A/D converter 5. The A/D converter 5 converts an input analog signal from image pickup processing into a digital signal. The FPN canceler 7 removes the FPN of the image pickup device 3.

The output from the FPN canceler 7 is connected to the input terminals of a color processing circuit 9 and a memory 22 for storing image data of one frame. The output from the color processing circuit 9 is connected to a monitor I/F 12 through white balance circuits 10r, 10g, and 10b. The color processing circuit 9 performs processing in accordance with the color filter array formed on the surface of the image pickup device 3, separates the input signal into R, G, and B signals, and outputs these signals. The white balance circuits 10r, 10g, and 10b respectively multiply the R, G, and B signals output from the color processing circuit 9 by a predetermined coefficient to balance the colors. The monitor I/F 12 converts the signals from the white balance circuits 10r, 10g, and 10b on the basis of the standard of a display system (monitor) and outputs a signal. In this embodiment, a general technique of converting an input digital signal into an analog signal using a D/A converter and adding a synchronous signal is used.

A sensor driving circuit 17 is connected to the image pickup device 3. The output from the sensor driving circuit 17 is connected to an electronic flash tube 20 through a light emission control circuit 18 and a light emission driving circuit 19. The sensor driving circuit 17 controls the operation of the image pickup device 3. The light emission control circuit 18 outputs a light emission signal (S-PULSE) on the basis of a light emission enable signal (S-EN) from a system controller 16 to control the timing and amount of light emission of the electronic flash tube 20.

The light emission amount of electronic flash is controlled by controlling the time from the start to the end of light emission of the electronic flash tube. More specifically, when the time is short, the light emission amount is small. When the time is long, the light emission amount is large. The light emission time for obtaining a desired light emission amount is generated by the light emission driving circuit 19. A pulse having a time interval for obtaining the light emission time or a pulse having a peak value corresponding to the light emission time may be used. In the latter case, a decoder for converting the pulse voltage value into a pulse interval must be arranged, as a matter of course.

The light emission driving circuit 19 causes the electronic flash tube to emit light on the basis of the light emission signal S-PULSE. The electronic flash tube 20 irradiates light onto the object. In the following description, the arrangement including the light emission control circuit 18, the light emission driving circuit 19, and the electronic flash tube 20 will be simply referred to as an "electronic flash unit". The operations of the respective units are controlled by the system controller 16.

The operation of the image pickup apparatus according to the first embodiment with the above arrangement will be described next.

A normal image pickup operation will be described first. In the above arrangement, the object light enters through the lens 1. After unwanted high-frequency components and infrared components are removed by the optical filter 2, the light is imaged on the surface of the image pickup device 3. The image pickup device 3 receives the incoming optical image, converts the optical image into an electrical signal, and outputs the electrical signal to the subsequent preamplifier 4. At this time, the sensor driving circuit 17 outputs various pulses for driving the horizontal and vertical scanning circuits of the image pickup device 3 to the image pickup device 3 such that the pixels of the image pickup device 3 are scanned to read out a video signal to the preamplifier 4.

The signal input to the preamplifier 4 is subjected to amplification OB clamp processing and converted into a digital signal by the A/D converter 5. After the fixed pattern noise of the image pickup device 3 is removed by the FPN canceler 7, the converted digital signal is input to the color processing circuit 9. The color processing circuit 9 performs color processing in accordance with the on-chip color filter array formed on the surface of the image pickup device 3, converts the signal into R, G, and B signals, and outputs these signals. Various color processing techniques are available in accordance with the type and array of color filters. However, the technique is not specified herein because the contents of this processing are not associated with the present invention.

The R, G, and B signals output from the color processing circuit 9 are multiplied by a predetermined gain by the white balance circuits 10r, 10g, and 10b, respectively, to balance the colors, and output to the monitor I/F 12. To output the signals in a form conforming to the standard of the display system (monitor; not shown), the monitor I/F 12 converts the input digital signals into analog signals by a D/A converter, adds a synchronous signal to the respective signals, and outputs the signals. The system controller 16 is constituted by an operation unit serving as a user interface, a CPU for managing the operation mode of the apparatus in accordance with setting of the operation unit, and the like. Normally, the image of the object is displayed on the monitor in accordance with the operation.

The operation in the electronic flash mode will be described. Generally, when the object image is dark, appropriate exposure cannot be obtained. Therefore, illumination light from a light source, i.e., electronic flash is necessary. The electronic flash tube 20 serving as a light source uses, e.g., a xenon electronic flash tube driven by the light emission driving circuit 19. The light emission driving circuit 19 is connected to the light emission control circuit 18 for controlling the start and end of light emission and light emission time of the electronic flash tube 20. The light emission control circuit 18 generates a light emission signal (S-PULSE) on the basis of a reference signal from the sensor driving circuit 17 and a light emission enable signal (S-EN) from the system controller 16 and supplies the light emission signal S-PULSE to the light emission driving circuit 19. The timing and amount of light emission of the electronic flash tube 20 are controlled by the light emission control circuit 18.

The operation of the light emission control circuit 18 will be described below in detail with reference to FIG. 2.

Figure 2:
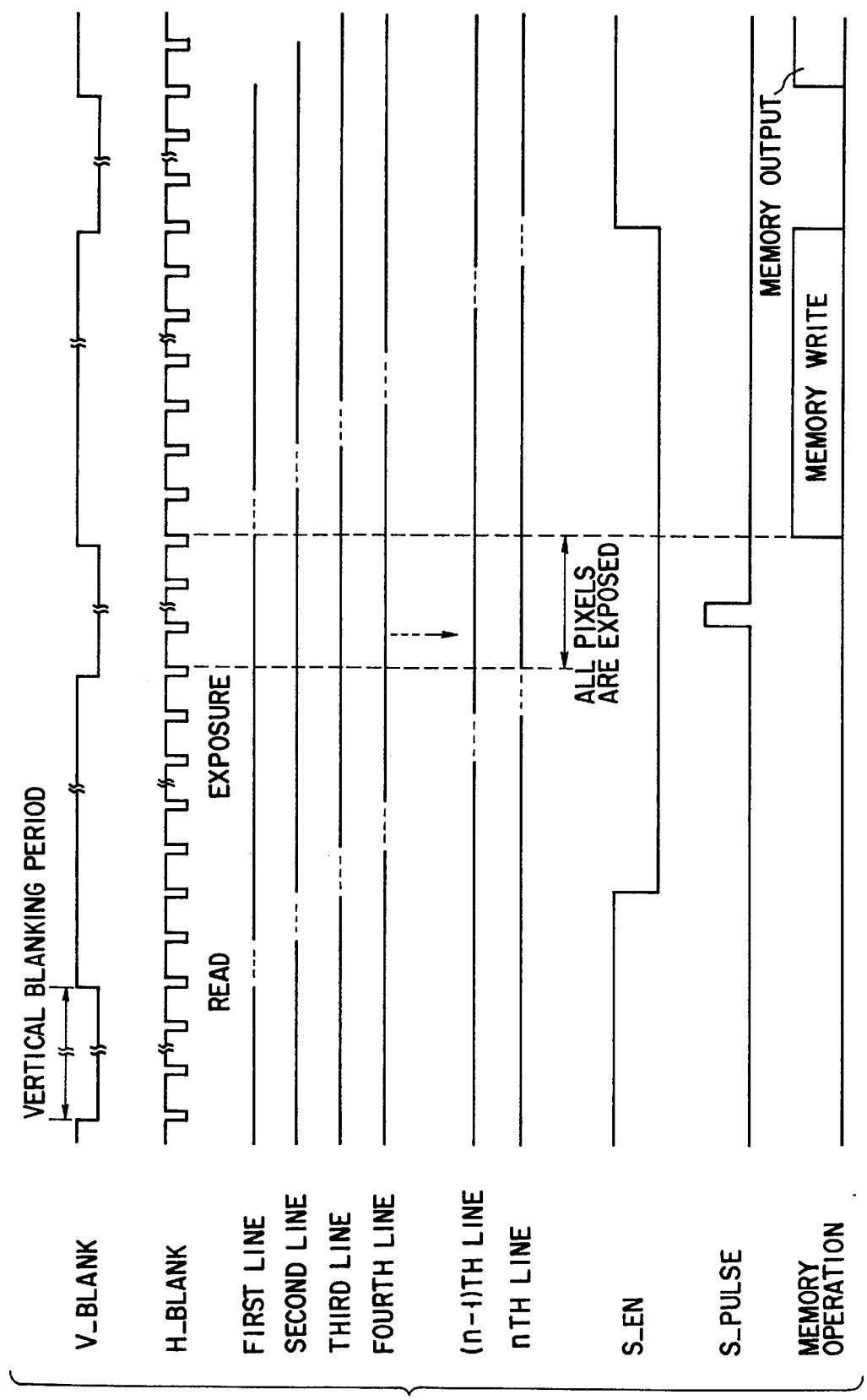
FIG. 2 is a timing chart showing the operation of a light emission control circuit in the first embodiment.

The first chart of FIG. 2 represents a signal V-BLANK as the reference of a field. The second chart of FIG. 2 represents a signal H-BLANK as the reference of a line. The third to eighth charts of FIG. 2 represent the read and exposure timings of the first to nth lines, respectively. As described above, the exposure timing of the X-Y address type solid-state image pickup device 3 is based on the vertical focal plane scheme in which the exposure timing shifts in units of lines. When the user designates an electronic flash photographing mode by operating the operation unit, the system controller 16 outputs a light emission enable signal S-EN represented by the ninth chart of FIG. 2 to the light emission control circuit 18 in a vertical blanking period for which all pixels can be exposed.

Upon receiving the light emission enable signal S-EN, the light emission control circuit 18 outputs a light emission signal S-PULSE represented by the 10th chart of FIG. 2 to the light emission driving circuit 19 on the basis of the reference signals V-BLANK and H-BLANK from the sensor driving circuit 17. The light emission driving circuit 19 drives the electronic flash tube 20 in accordance with the light emission signal S-PULSE so that the electronic flash tube 20 emit light in accordance with the timing of the light emission signal S-PULSE.

An appropriately exposed image is obtained only from pixels which are exposed upon light emission of the electronic flash tube 20. When a reset voltage VRS is applied, no appropriate exposure can be obtained in the subsequent normal exposure operation without electronic flash light emission. For this reason, image signals for which appropriate exposure has been obtained are sequentially stored in the memory 22, as represented by the 11th chart of FIG. 2. After the signal of one frame is stored, the signal stored in the memory 22 is output at the next timing. With this operation, the image with appropriate exposure is displayed as a still image.

According to the above-described first embodiment, even when an X-Y address type solid-state image pickup device such as a CMD and a short-time light-emitting unit such as an electronic flash unit are used, an appropriate image can be obtained.

Figure 3:
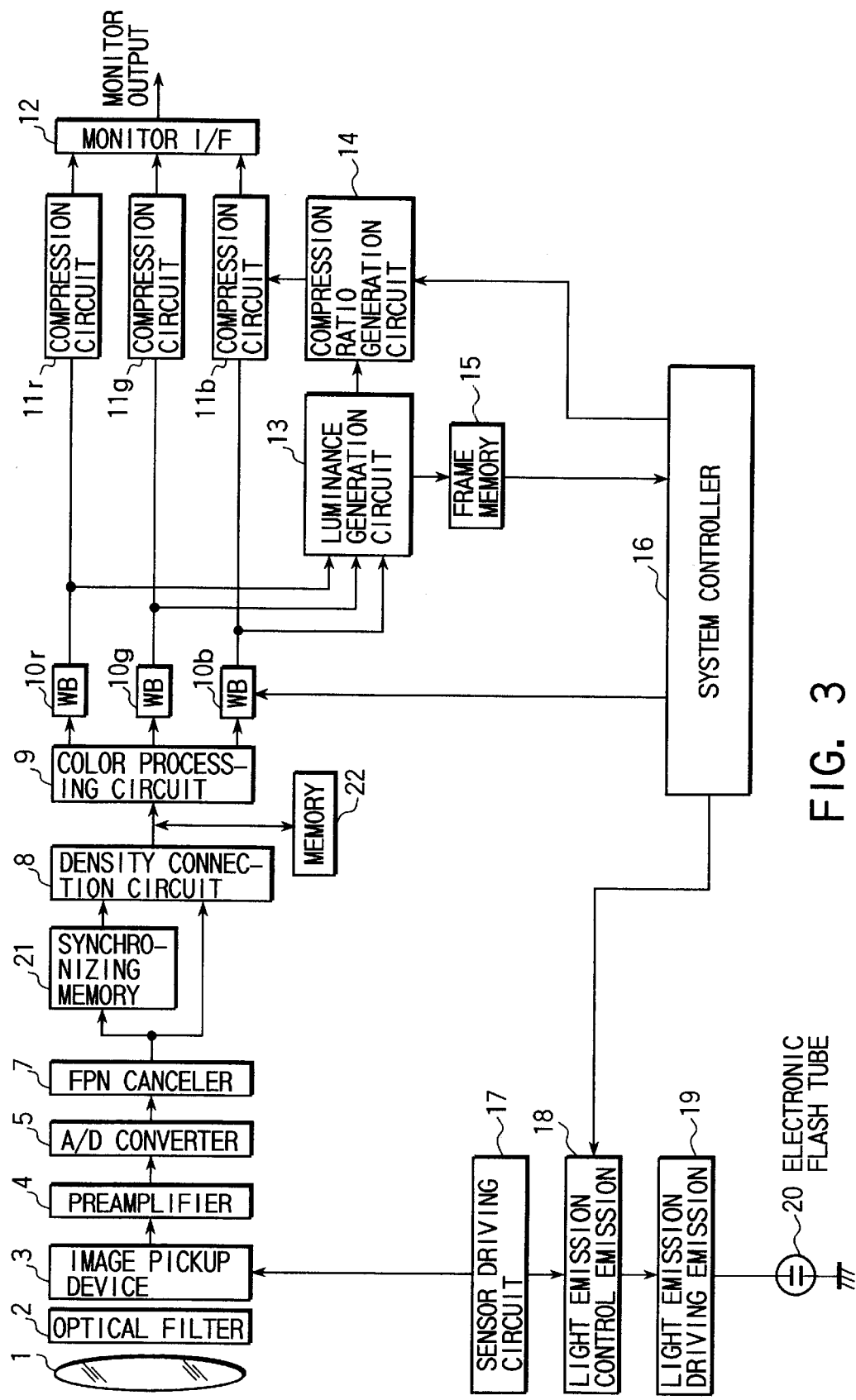
FIG. 3 is a block diagram showing the arrangement of an image pickup apparatus according to the second embodiment.

FIG. 3 is a block diagram showing the arrangement of an image pickup apparatus according to the second embodiment.

A description of the same arrangements and functions as in the first embodiment will be omitted.

In this embodiment, as shown in FIG. 3, the output from an FPN canceler 7 is connected to a density connection circuit 8 directly or through a synchronizing memory 21. The output from the density connection circuit 8 is connected to a monitor I/F 12 through white balance circuits 10r, 10g, and 10b and compression circuits 11r, 11g, and 11b. The outputs from the white balance circuits 10r, 10g, and 10b are connected to the compression circuits 11r, 11g, and 11b through a luminance generation circuit 13 and a compression ratio generation circuit 14, respectively. The output from the luminance generation circuit 13 is connected to a system controller 16 through a frame memory 15. The remaining arrangements are the same as in the first embodiment.

The density connection circuit 8 synthesizes image data of two frames with different exposure amounts to obtain image data of one frame whose dynamic range is widened. The compression circuits 11r, 11g, and 11b compress the image data having the wider dynamic range to the dynamic range of a display system (monitor). The luminance generation circuit 13 generates a luminance signal from the respective color signals (R, G. and B signals) having the wider dynamic ranges. The compression ratio generation circuit 14 generates a compression ratio on the basis of the luminance signal and a compression coefficient from the system controller 16. The frame memory 15 stores the luminance signal of one frame and outputs the luminance signal to the system controller 16. The synchronizing memory 21 stores image data of one field. In this embodiment, the means for synthesizing two frames is constituted by the density connection circuit 8, the compression circuits 11r, 11g, and 11b, the luminance generation circuit 13, and the compression ratio generation circuit 14. However, the arrangement is not limited to this. For example, this means can be constituted by the density connection circuit 8 and a look-up table, as a matter of course.

Figure 4:
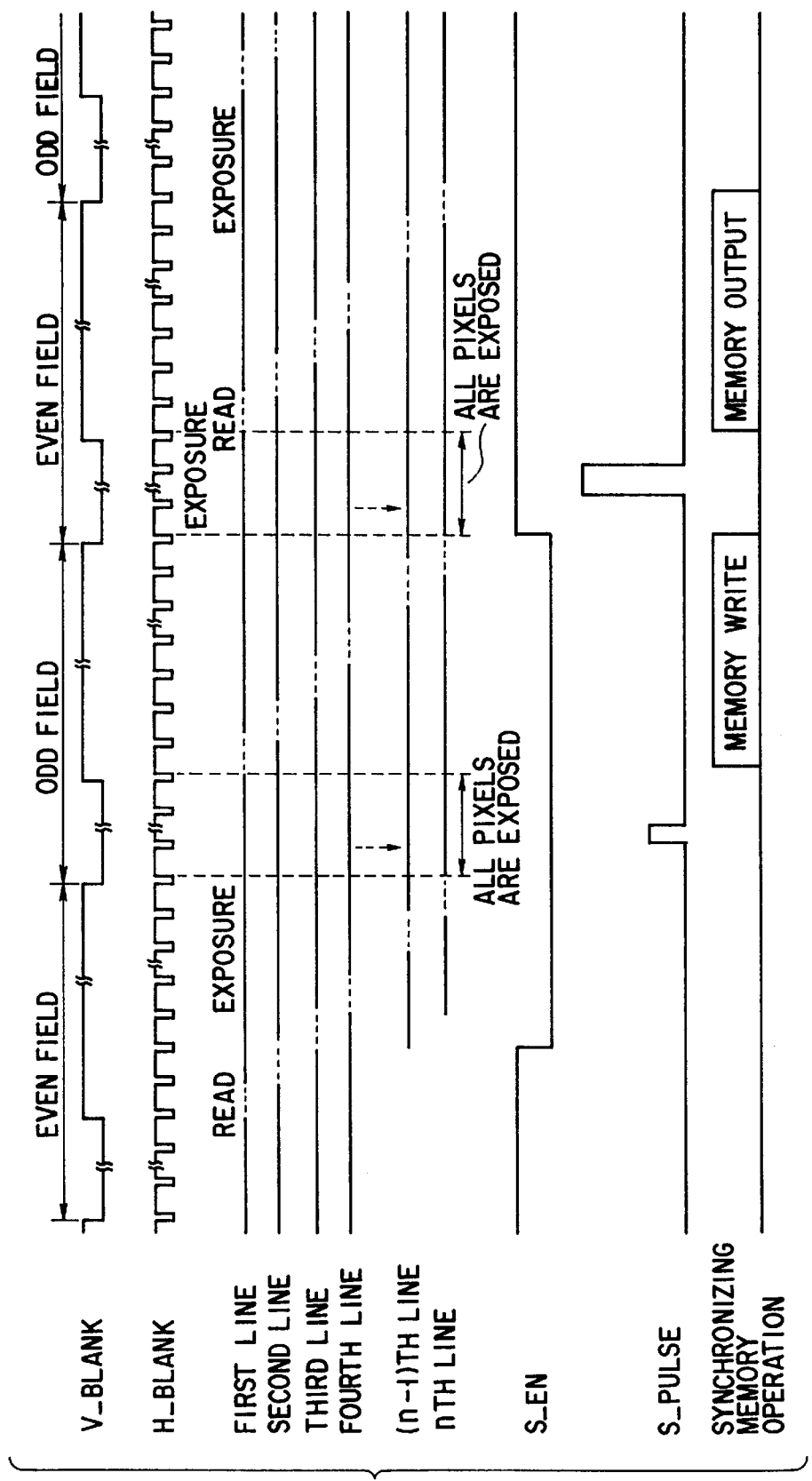
FIG. 4 is a timing chart showing the operation of a light emission control circuit in the second embodiment.

The operation of a light emission control circuit 18 in the second embodiment will be described below in detail with reference to FIG. 4. The first chart of FIG. 4 represents a signal V-BLANK as the reference of a field. The second chart of FIG. 4 represents a signal H-BLANK as the reference of a line. The third to eighth charts of FIG. 4 represent the read and exposure timings of the first to nth lines, respectively. When the user designates an electronic flash photographing mode by operating an operation unit, the system controller 16 outputs a light emission enable signal S-EN to the light emission control circuit 18 (the ninth chart of FIG. 4).

Upon receiving the light emission enable signal S-EN, the light emission control circuit 18 outputs a light emission signal S-PULSE on the basis of the reference signals V-BLANK and H-BLANK to cause light emission in a small amount while all pixels are exposed in an odd field and to cause light emission in a large amount while all pixels are exposed in an even field (10th chart of FIG. 4).

A light emission driving circuit 19 drives an electronic flash tube 20 in accordance with the light emission signal S-PULSE. The electronic flash tube 20 emits light in a small amount in an odd field, and light in a large amount in an even field. With this operation, two frames with different exposure amounts can be obtained in the odd and even fields.

In an odd field, the signal from which fixed pattern noise of the image pickup device 3 is removed by the FPN canceler 7 is stored in the synchronizing memory 21. In an even field, the signal from the FPN canceler 7 is output to the density connection circuit 8, and the image data of the odd field is read out from the synchronizing memory 21 in synchronism with the timing of the sensor driving circuit 17 and output to the density connection circuit 8 (11th chart of FIG. 4).

An odd field signal and an even field signal, which have different exposure amounts, are input to the density connection circuit 8. An image having a wider dynamic range is synthesized from the two signals and output to the color processing circuit 9. The operation of synthesizing an image having a wider dynamic range from two image signals with different storage times from the image pickup device 3 is described in detail in Jpn. Pat. Appln. KOKAI Publication No. 5-308573 filed by the present inventor, and a detailed description thereof will be omitted.

The outputs from the white balance circuits 10r, 10g, and 10b are input to the compression circuits 11r, 11g, and 11b, respectively, and also input to the luminance generation circuit 13. The luminance generation circuit 13 generates a luminance signal from the R, G, and B signals and inputs the luminance signal to the compression ratio generation circuit 14 and the frame memory 15. The frame memory 15 stores image data of one frame.

The stored image data is output in accordance with a read instruction from the system controller 16. The system controller 16 calculates an appropriate compression coefficient from the luminance signal of the picked up image and outputs the coefficient to the compression ratio generation circuit 14.

The compression ratio generation circuit 14 generates a compression ratio on the basis of the luminance signal from the luminance generation circuit 13 and the compression coefficient from the system controller 16 and outputs the compression ratio to the compression circuits 11r, 11g, and 11b. The compression circuits 11r, 11g, and 11b multiply the signals from the white balance circuits 10r, 10g, and 10b by the compression ratio from the compression ratio generation circuit 14, respectively, and output the signals to the monitor I/F 12. With this processing, an image with a wider dynamic range is displayed on the monitor.

According to the second embodiment, even when an X-Y address type solid-state image pickup device and a short-time light-emitting unit such as an electronic flash unit are used, an image with a small exposure amount is obtained in an odd field, and an image with a large exposure amount is obtained in an even field. Two frames with different exposure amounts can be obtained by adjusting the timing by the synchronizing memory. Therefore, an image with a wider dynamic range can be obtained by the image synthesizing unit.

As is apparent, even when the relationship between the odd field and the light emission amount may be reversed in the second embodiment, the same effect as described above can be obtained. In the second embodiment, synthesis of images obtained by performing the exposure operation twice is exemplified. Even images obtained by a larger number of times of exposure operations can be synthesized, as a matter of course.

This embodiment is applied to a case wherein natural light can be neglected because it is weaker than electronic flash light. Although the ratio of the electronic flash light amounts in the odd and even fields has a predetermined value, the ratio of accumulated charges does not always become the predetermined value. This problem is solved by the third embodiment to be described below.

Figure 5:
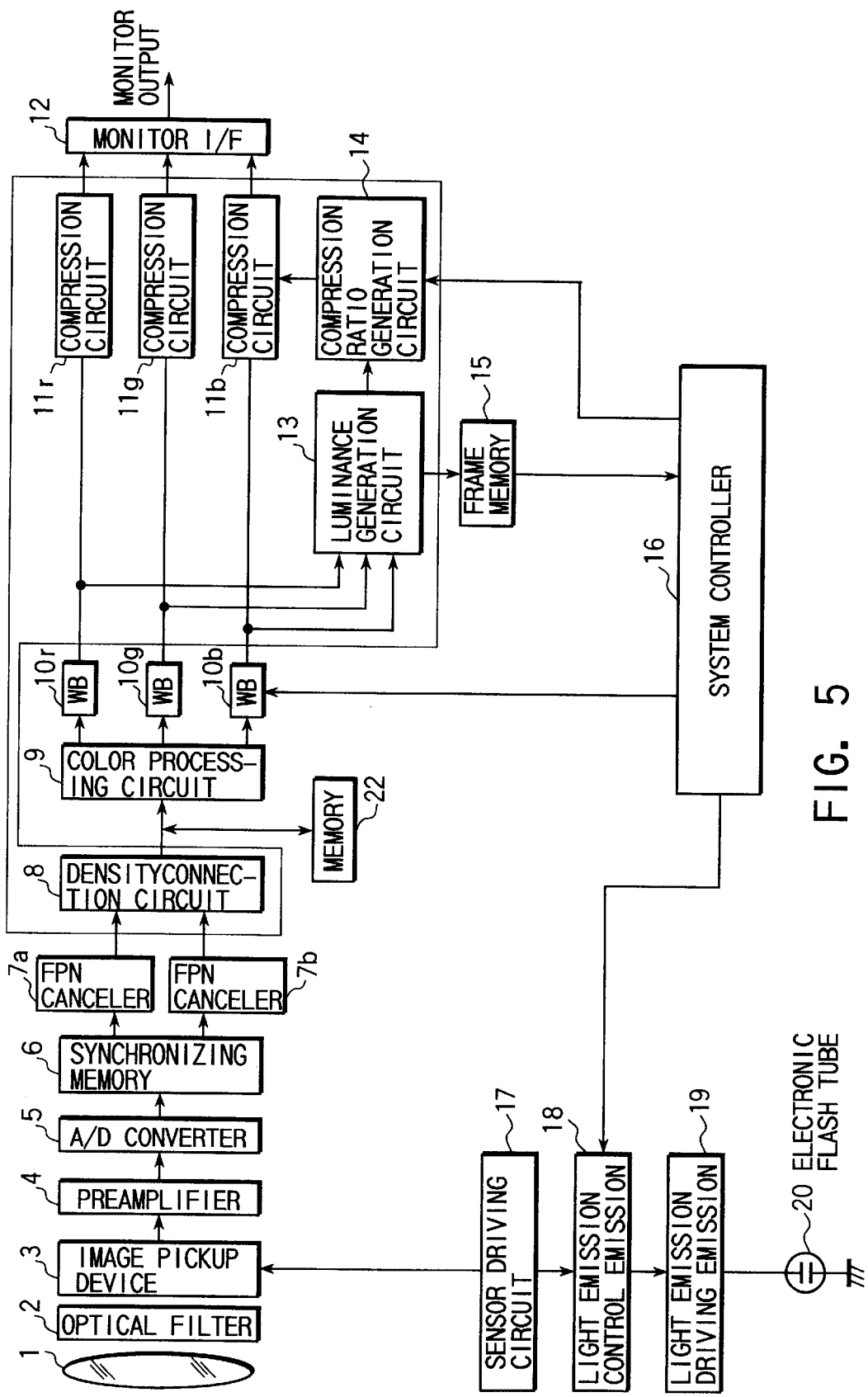
FIG. 5 is a block diagram showing the arrangement of an image pickup apparatus according to the third embodiment.

FIG. 5 is a block diagram showing the arrangement of an image pickup apparatus according to the third embodiment.

A description of the same arrangements and functions as in the second embodiment will be omitted.

As shown in FIG. 5, the third embodiment is different from the second embodiment in that the output from an A/D converter 5 is connected to the input terminal of a synchronizing circuit 6, and the output from the synchronizing circuit 6 is connected to the input terminal of a density connection circuit 8 through FPN cancelers 7a and 7b.

The synchronizing circuit 6 adjusts the timings of two frames which are compressed along the time axis and read out in the horizontal period. A sensor driving circuit 17 drives an image pickup device 3 to independently obtain two frames with different exposure amounts within one field period. The principle of this operation is described in detail in Jpn. Pat. Appln. KOKAI Publication No. 7-38815, and a detailed description thereof will be omitted.

The operation of a light emission control circuit 18 in the third embodiment will be described below with reference to FIG. 6.

When a reset voltage VRS is applied to a given line, the charges accumulated in the line are reset to start exposure. After a predetermined period (4H), a read voltage VRD is applied to the line to read out a signal. With this operation, a signal with an exposure time of 4H is read out. Since this read processing is nondestructively performed, exposure is continued without applying the reset voltage.

After a one-field period, the read voltage VRD is applied again to read out a signal. With this operation, a signal with an exposure period corresponding to one field is read out. After this signal is read out, the reset voltage VRS is applied to reset the accumulated charges.

Figure 6:
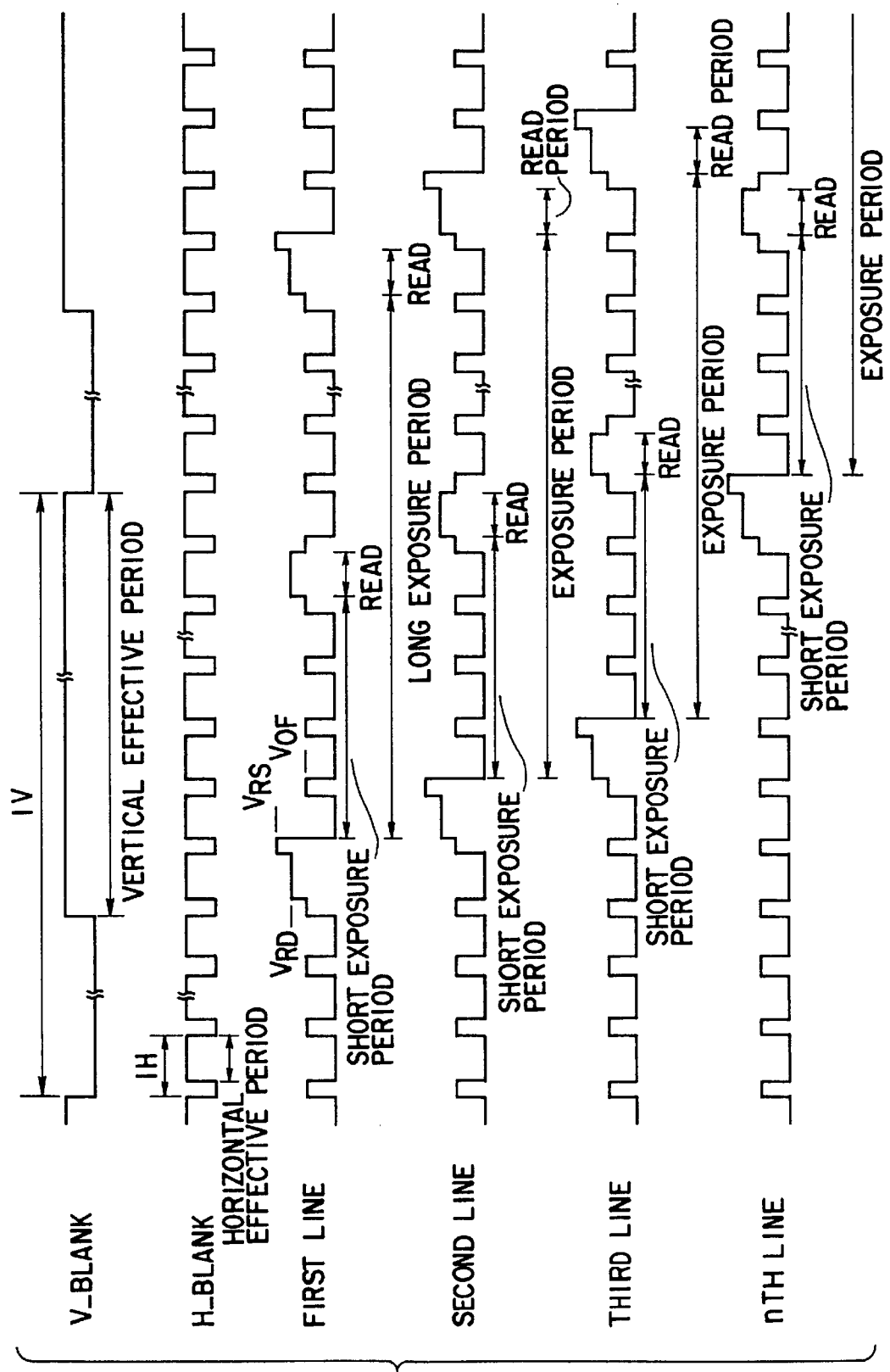
FIG. 6 is a timing chart showing the operation of a light emission control circuit in the third embodiment.

As is apparent from FIG. 6, the nondestructive read processing for short-time exposure and the read processing for long-time exposure after four lines must be simultaneously performed. For this purpose, one horizontal period is time-divided. Read processing for short-time exposure is performed at a speed of 2× for the first half period of the horizontal period, and read processing for long-time exposure is performed at a speed of 2× for the second half period. With this processing, two frame signals with different exposure amounts are time-divided and read out within one horizontal period. Image data converted into a digital signal by the A/D converter 5 is converted by the synchronizing circuit 6 such that the signal for the short exposure period and that for the long exposure period are synchronized with each other.

In the actual operation, a line memory is used to reconstruct the horizontal time axis before compression. In addition, a field memory is used to cancel shifts of the vertical time axis. Thereafter, the respective signals are input to the FPN cancelers 7a and 7b to remove fixed pattern noise of the image pickup device 3 and input to the density connection circuit 8. With this processing, a signal having a wider dynamic range can be obtained at a normal moving image rate.

Figure 7:
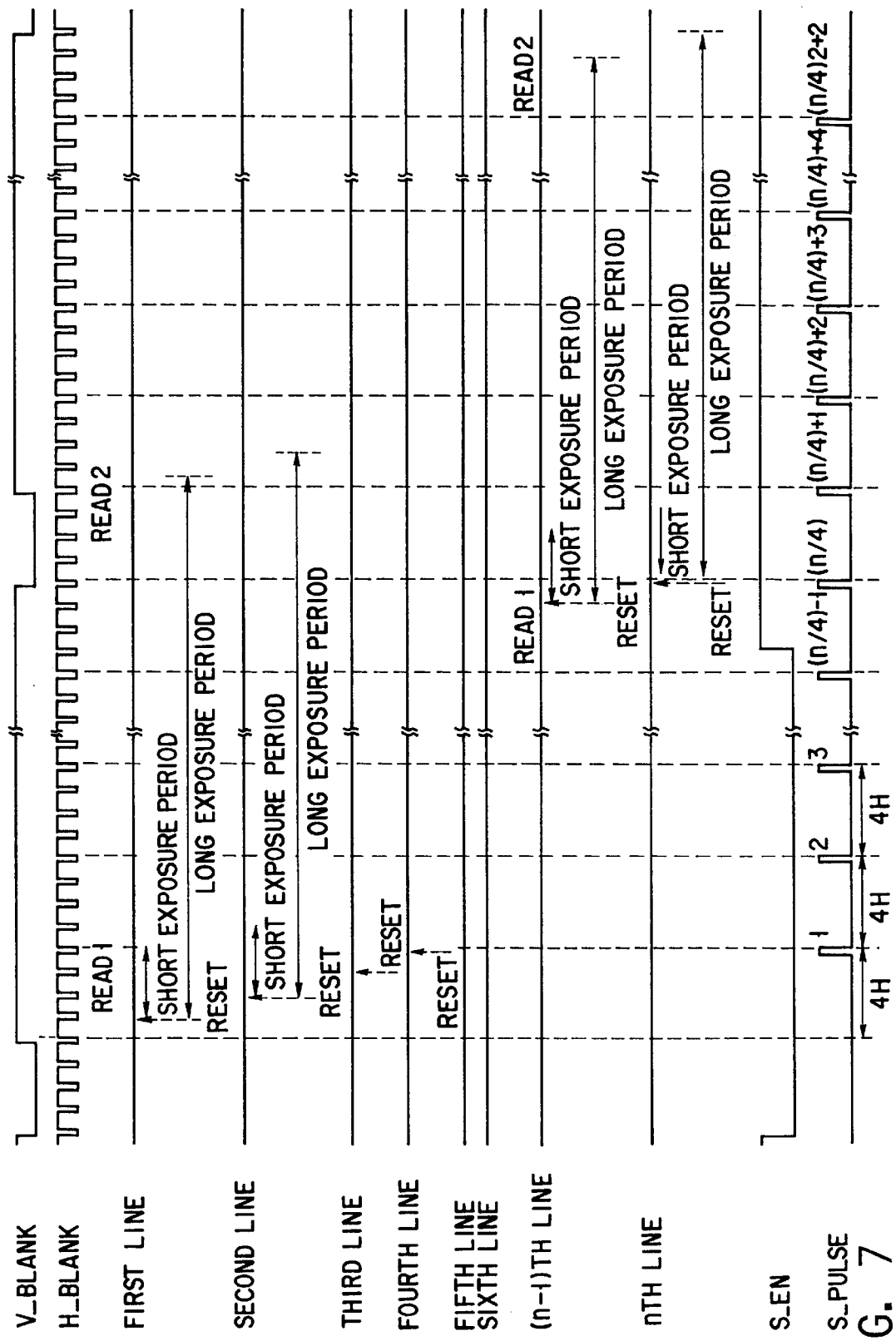
FIG. 7 is a timing chart for explaining an operation performed when an electronic flash tube is used in the image pickup apparatus of the third embodiment.

An operation performed when an electronic flash tube 20 is used in this image pickup apparatus will be described next with reference to FIG. 7. An operation for the short exposure period of 4H will be described as an example. Upon receiving a light emission enable signal S-EN from a system controller 16, a light emission control circuit 18 outputs a light emission signal S-PULSE after 4H from the start of a field on the basis of reference signals from the sensor driving circuit 17. Thereafter, the light emission enable signal is output at an interval of 4H for about a two-field period.

Signal read processing for the short exposure period will be described first. Since the first light-emitting operation is performed within the short exposure period from the first line to the fourth line, the first to fourth lines are exposed upon the first light-emitting operation. The fifth to eighth lines are exposed upon the second light-emitting operation. This operation is repeated to expose the (n−3)th to nth lines upon the (n/4)th (n is the total number of lines) light-emitting operation. With this operation, each line from which a signal is nondestructively read out for short-time exposure is exposed upon one light-emitting operation.

Signal read processing for the long exposure period will be described next. The first to fourth lines are sequentially repeatedly exposed by the first to (n/4+1)th light-emitting operations from the first light-emitting operation to read 2. The fifth to eighth lines are sequentially repeatedly exposed upon the second to (n/4+2)th light-emitting operations. This operation is performed for the respective lines. Therefore, each line is exposed by the (n/4+1)-times light-emitting operations.

As described above, for the nondestructively readout signal for the short exposure period and the normal readout signal for the long exposure period, the number of times of light-emitting operations of the electronic flash tube 20 changes for the respective exposure periods at a predetermined ratio. With this arrangement, two frames with different exposure amounts are obtained. The ratio of exposure amounts corresponds to the ratio of the short exposure period to the long exposure period and has a desired value which is less influenced by the brightness of natural light. In the above description, the short exposure period corresponds to the light emission interval. However, the light may be emitted at a smaller interval, or the light emission interval may be made much smaller to substantially perform continuous light emission.

According to the third embodiment, even when an X-Y address type solid-state image pickup device and a short-time light-emitting means such as an electronic flash unit are used for the nondestructive read portion where a signal is nondestructively read out to obtain a signal accumulated for a short time and the read portion where a signal accumulated for a relatively long time is obtained, two frames with different exposure amounts can be obtained. Therefore, an image having a wider dynamic range can be obtained by the image synthesizing unit. In addition, the image can be obtained at a normal moving image rate. The ratio of light amounts of the electronic flash equals the ratio of exposure periods. Since the ratio of exposure amounts for the object at which light from the electronic flash tube 20 arrives (the exposure amount depends on the light emission amount) equals that for the background at which the light from the light-emitting means does not arrive (the exposure amount depends on the exposure period), an image having an appropriate and wider dynamic range can be obtained for both the object and the background.

Figure 8:
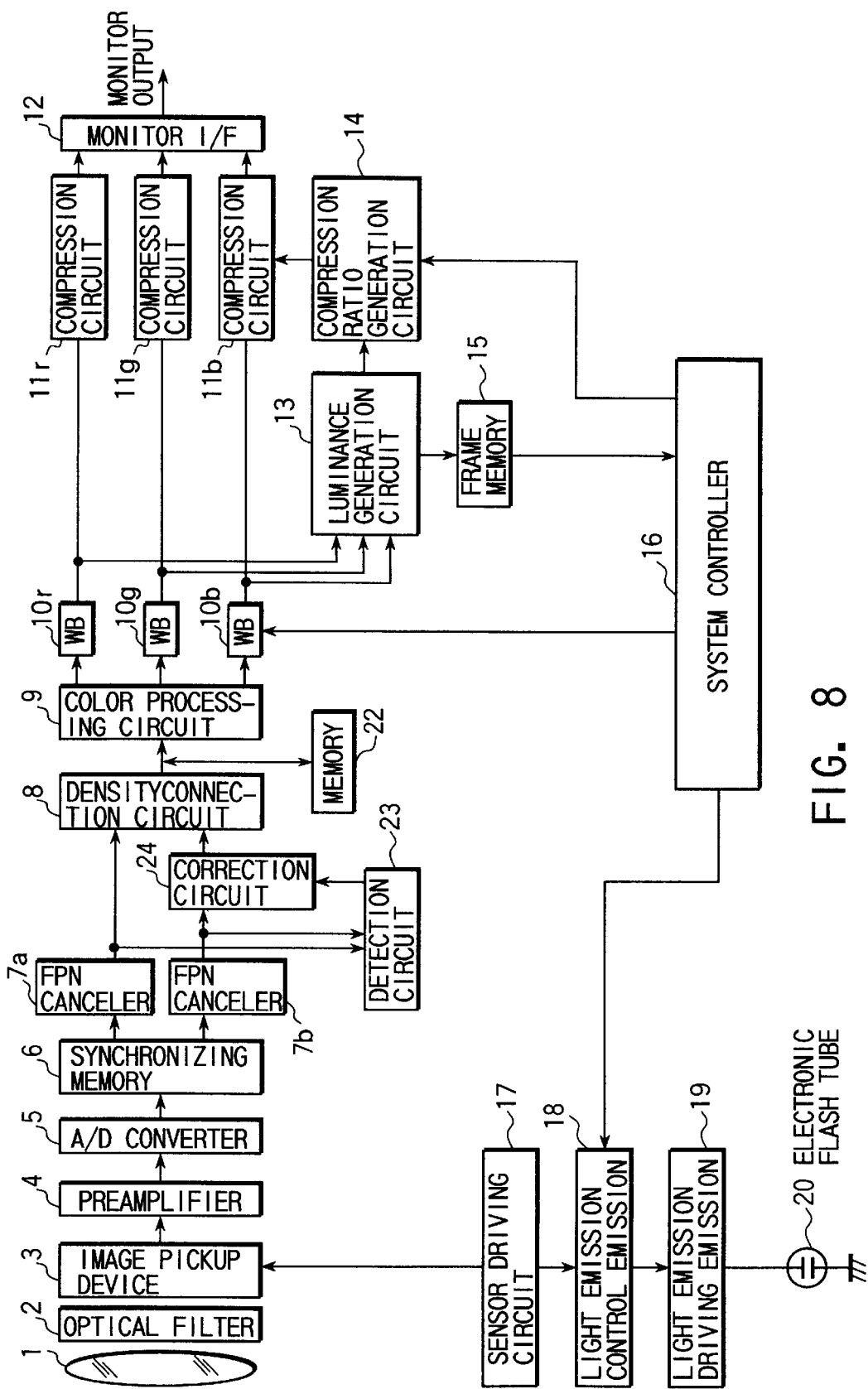
FIG. 8 is a block diagram showing the arrangement of an image pickup apparatus according to the fourth embodiment.

FIG. 8 shows an image pickup apparatus according to the fourth embodiment.

A description of the same arrangements and functions as in the first to third embodiments will be omitted.

In the fourth embodiment, as shown in FIG. 8, the output from an A/D converter 5 is connected to the inputs of FPN cancelers 7a and 7b through a synchronizing circuit 6. The output from the FPN canceler 7a is directly connected to a density connection circuit 8, and the output from the FPN canceler 7b is connected to the density connection circuit 8 through a correction circuit 24.

The outputs from the FPN cancelers 7a and 7b are also connected to a detection circuit 23. The output from the detection circuit 23 is connected to the correction circuit 24. The remaining arrangement is the same as in the third embodiment. The detection circuit 23 detects variations in light emission amount from image data of two frames with different exposure amounts. The correction circuit 24 corrects the image data on the basis of a signal obtained by the detection circuit 23.

In this arrangement, the signals from the FPN cancelers 7a and 7b are received by the detection circuit 23. The detection circuit 23 calculates the average values of image data (for, e.g., 1H period) of signals for the short and long exposure periods. The ratio between the ratio of the two average values and the ratio of the exposure times is output to the correction circuit 24 as a correction coefficient. The correction circuit 24 multiplies the image data by the correction coefficient and outputs the image data to the density connection circuit 8. With this processing, the ratio of the signal for the short exposure period to that for the long exposure period equals the ratio of the exposure times, so that variations in light emission amount are corrected.

As described above, according to the fourth embodiment, even when an X-Y address type solid-state image pickup device and a short-time light-emitting means such as an electronic flash unit are used, two desired frames with different exposure amounts can be obtained. Therefore, an image having a wider dynamic range can be obtained by an image synthesizing unit. Since the detection circuit 23 for detecting variations in light emission amount of the light-emitting unit and the correction circuit 24 for correcting image data are arranged, images are appropriately synthesized by the synthesizing unit, thus preventing a degradation in image quality. The detection circuit 23 performs calculation using image data to be actually synthesized to detect variations in light emission, so that the detection precision is high, and correction can be properly performed.

Figure 9:
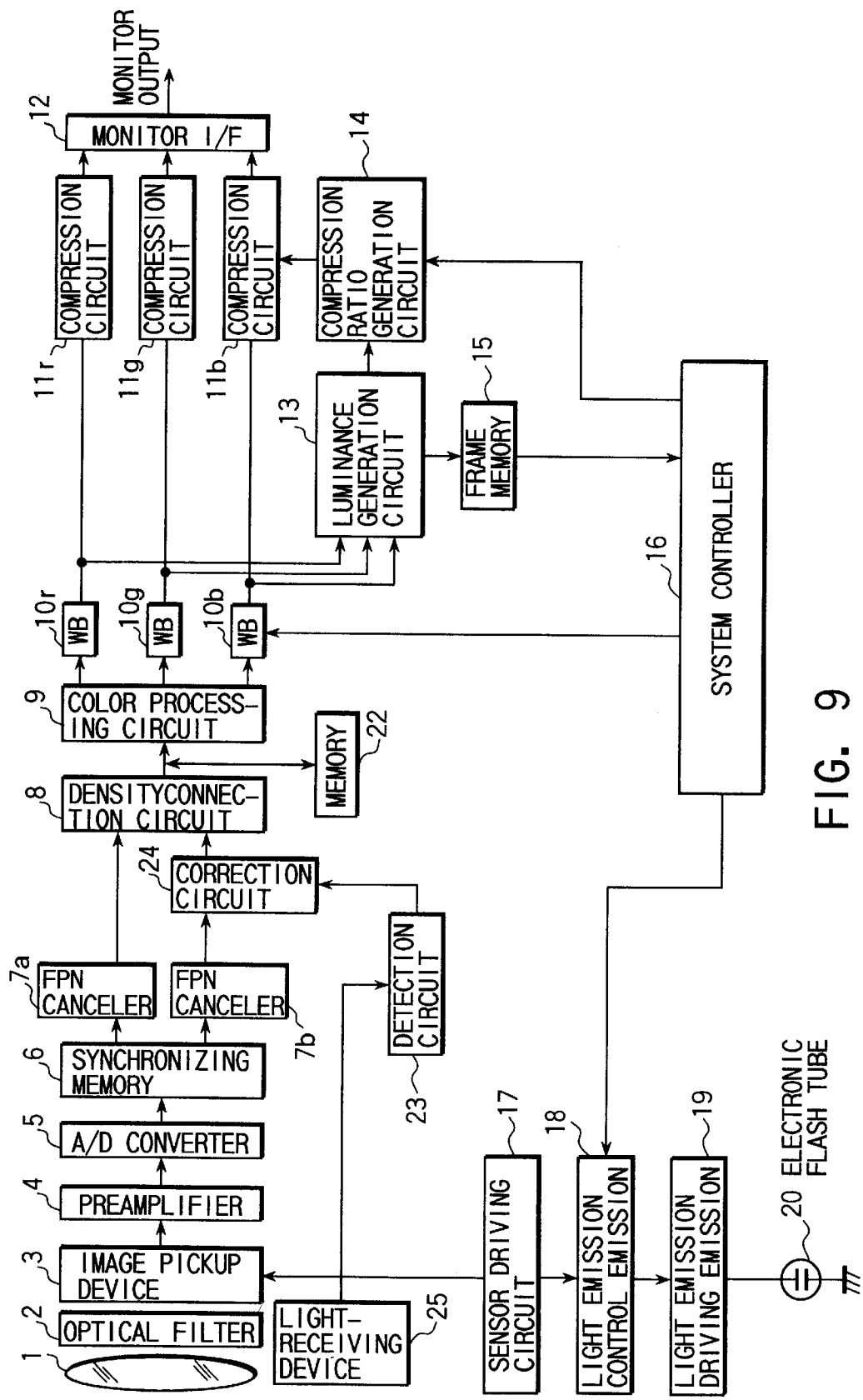
FIG. 9 is a block diagram showing the arrangement of an image pickup apparatus according to the fifth embodiment.

FIG. 9 shows an image pickup apparatus according to the fifth embodiment of the present invention.

A description of the same arrangements and functions as in the first to fourth embodiments will be omitted.

As shown in FIG. 9, this embodiment includes a light-receiving device 25 for receiving light from an object, converting the light into an electrical signal, and outputting the electrical signal to a detection circuit 23. The outputs from FPN cancelers 7a and 7b are not connected to the detection circuit 23. The remaining arrangement is the same as in the fourth embodiment.

In this arrangement, the light-receiving device 25 integrates the exposure amount for each exposure period, converts the exposure amount into an electrical signal proportional to the exposure amount, and outputs the electrical signal to the detection circuit 23 in synchronism with the driving timing of an image pickup device 3. The detection circuit 23 outputs the ratio of the input electrical signal to a reference value to a correction circuit 24 as a correction coefficient. The correction circuit 24 multiplies image data by the correction coefficient and outputs the image data to a density connection circuit 8.

In the fifth embodiment, the detection circuit 23 detects variations in light emission using the signal from the light-receiving device 25. With this arrangement, the means for calculating the average values described in the fourth embodiment can be omitted. Correction can be performed with a simple arrangement, and a degradation in image quality due to image synthesis by a synthesizing unit can be prevented.

Figure 10:
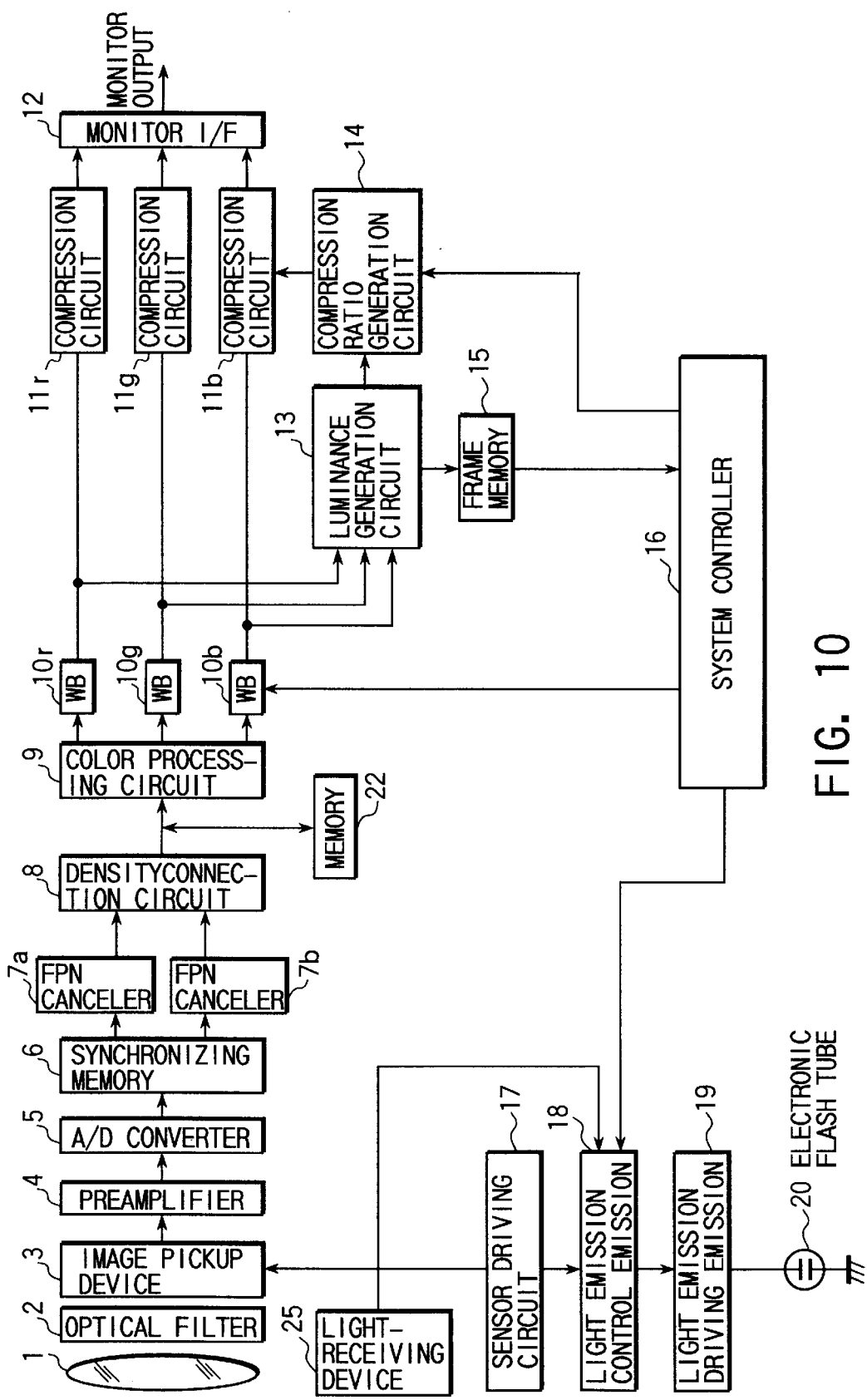
FIG. 10 is a block diagram showing the arrangement of an image pickup apparatus according to the sixth embodiment.
Figure 11:
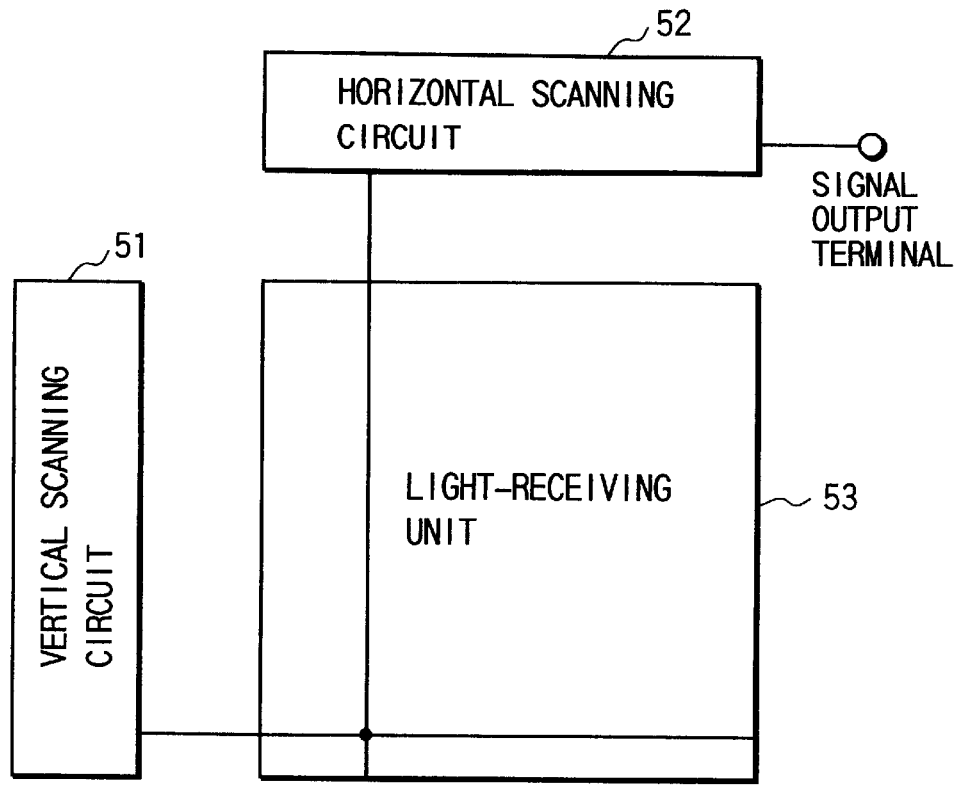
FIG. 11 is a view showing the concept of a CMD.
Figure 14:
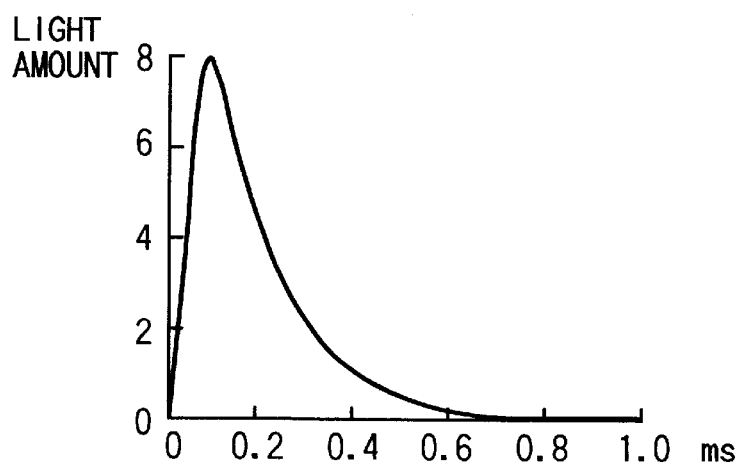
FIG. 14 is a graph showing the characteristics of an electronic flash tube.
Figure 12:
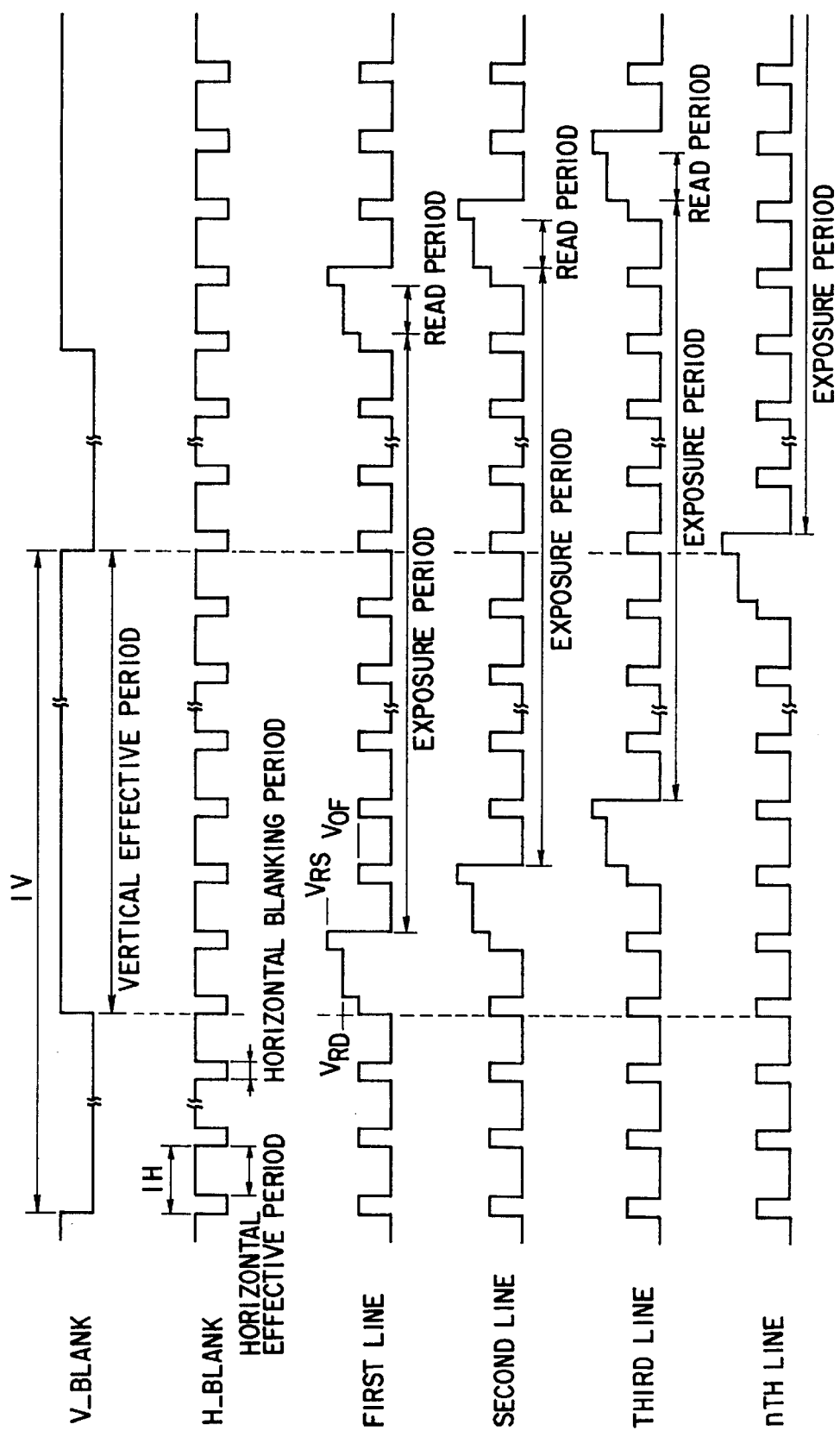
FIG. 12 is a timing chart for explaining the operation of a vertical scanning circuit in the CMD.
Figure 13:
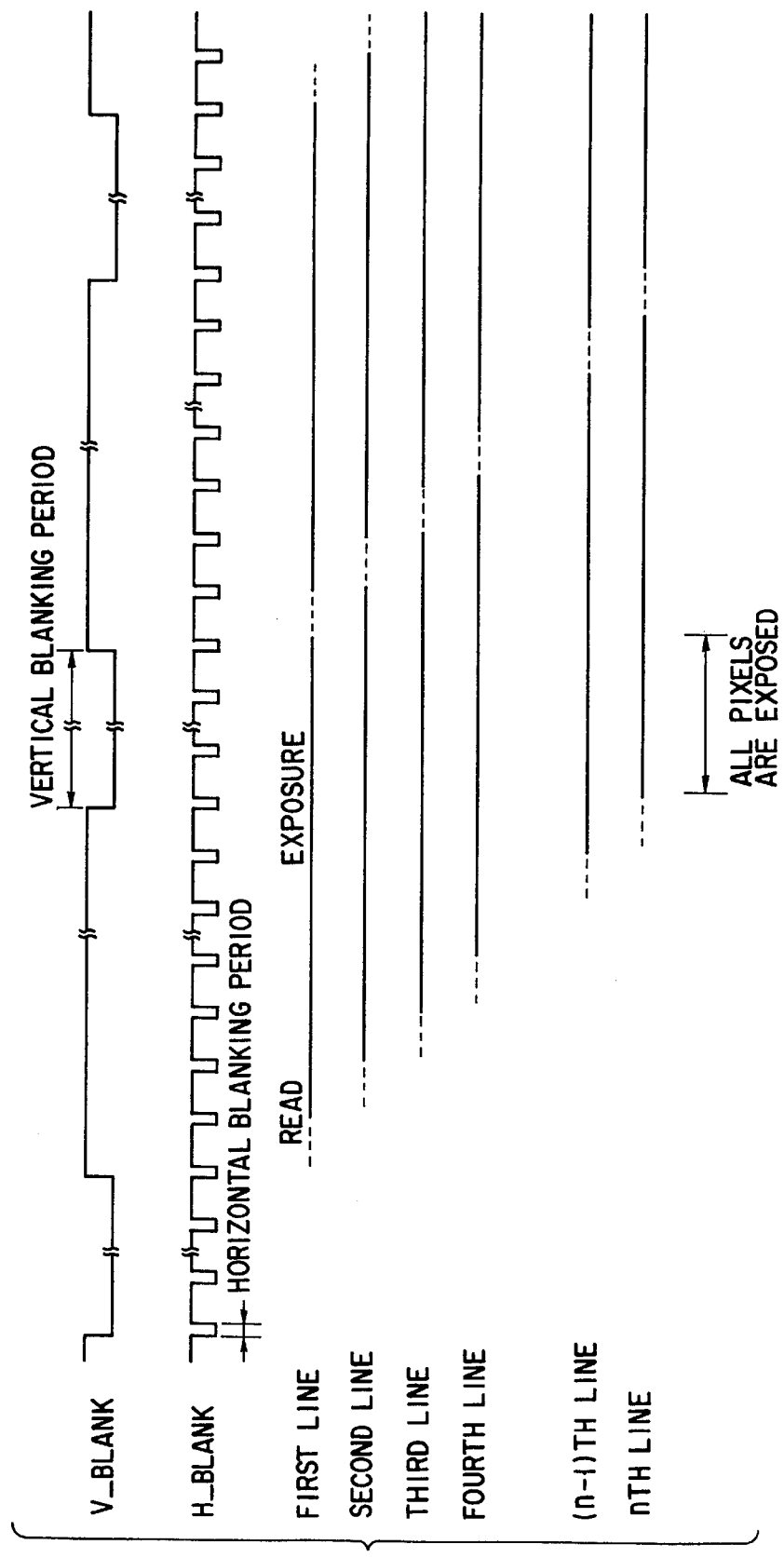
FIG. 13 is a timing chart for explaining a focal plane scheme associated with the exposure timing of an X-Y address type solid-state image pickup device.

FIG. 10 shows an image pickup apparatus according to the sixth embodiment of the present invention.

A description of the same arrangements and functions as in the first to fourth embodiments will be omitted.

As shown in FIG. 10, this embodiment is different from the fifth embodiment in that the detection circuit 23 and the correction circuit 24 are omitted, and the output from a light-receiving device 25 is connected to a light emission control circuit 18. The remaining arrangement is the same as in the fifth embodiment.

In this arrangement, the light-receiving device 25 integrates the exposure amount for each exposure period, converts the exposure amount into an electrical signal, and outputs the electrical signal to the light emission control circuit 18 in synchronism with the driving timing of an image pickup device. The light emission control circuit 18 controls a light emission driving circuit 19 by known direct photometry based on the signal from the light-receiving device 25 such that while the exposure amount does not reach a predetermined light amount due to variations in light emission, light emission is continued, and when the exposure amount reaches the predetermined light amount, light emission is stopped, thereby equalizing the light emission amount.

In the sixth embodiment, the light emission control circuit 18 controls the light emission driving circuit 19 on the basis of the signal from the light-receiving device 25 for receiving the light from the object and converting the light into an electrical signal so that the light emission amount does not vary. Therefore, an appropriate synthesized image can be obtained with an arrangement simpler than that for image data correction.

The embodiments of the present invention have been described above. The present invention is not limited to the above embodiments, and various changes and modifications can be made within the spirit and scope of the invention. In the above description, a CMD is used as the X-Y address type solid-state image pickup device. However, the device is not limited to this, as a matter of course.

The seventh to 12th embodiments will be described below.

Prior to a detailed description of the individual embodiments, the principle of the present invention will be briefly described. First, a principle of obtaining an image having a wider dynamic range on the basis of a plurality of (e.g., two) images (image data) obtained upon an image pickup operation using different exposure amounts will be described.

Assume that a certain image pickup field (object) is subjected to the first exposure operation with a relatively large total exposure amount (e.g., exposure for a relatively long exposure time). In the image obtained by this first exposure operation, the dark portion (low-luminance portion) of the object is appropriately reproduced relative to the bright portion, although the bright portion (high-luminance portion) reaches the saturation level and is reproduced only in an inappropriate state such as so-called "blooming". Assume that the same object is subjected to the second exposure operation with a relatively small total exposure amount (e.g., exposure for a relatively short exposure time). In the image obtained by this second exposure operation, the dark portion (low-luminance portion) of the object is reproduced only in an in appropriate noisy state such as so-called "smearing" because of its excessively low signal level. On the other hand, the bright portion (high-luminance portion) is appropriately reproduced relative to the dark portion.

When the image of the object is picked up in units of regions such that the image of each region is appropriately reproduced by the first or second exposure operation, and images (image data) representing the same object are formed on the basis of the images (image data) obtained by the first and second exposure operations, an image (image data) having a wider dynamic range can be obtained. As is apparent from the above description, this processing ("synthesis" mentioned in this specification) is not only simple addition processing, as a matter of course.

Conditions necessary for effectively applying the dynamic range increasing method based on the above-described principle even in use of a flash light-emitting means such as an electronic flash unit in image pickup processing will be described. To broaden the dynamic range on the basis of the above-described principle, exposure allotment is made such that the image of the relatively dark portion (low-luminance portion) of the object is picked up by the first exposure operation, and the image of the relatively bright portion (high-luminance portion) of the object is picked up by the second exposure operation. Even in use of the flash light-emitting means such as an electronic flash unit in image pickup processing, this allotment must be maintained. Therefore, the total exposure amount including the exposure amount of flash light emission in the second exposure operation must not exceed the total exposure amount including the exposure amount of flash light emission in the first exposure operation.

Figure 15:
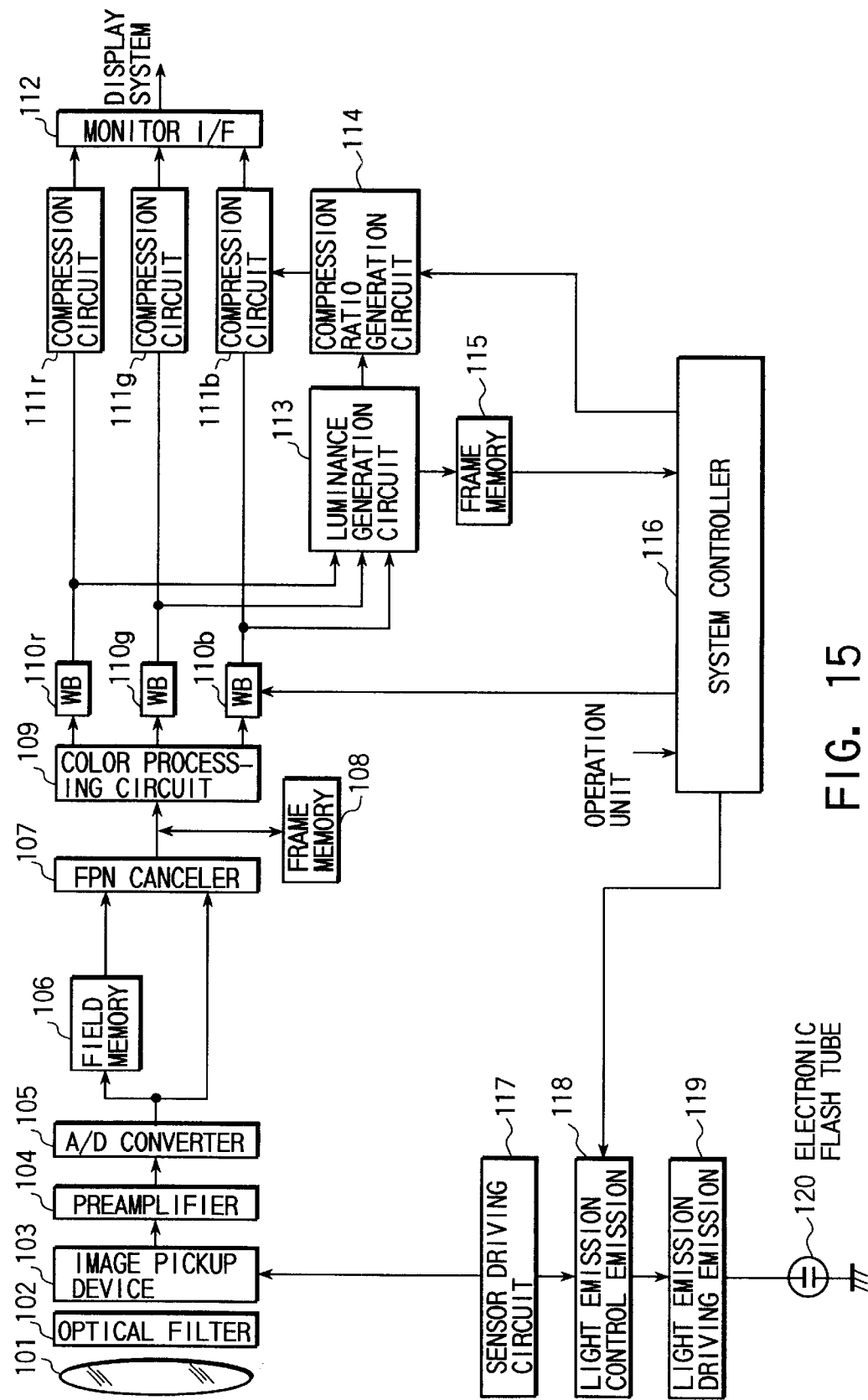
FIG. 15 is a block diagram showing the arrangement of an image pickup apparatus according to the seventh embodiment.

FIG. 15 shows the arrangement of an image pickup apparatus according to the seventh embodiment of the present invention. This image pickup apparatus is constituted by a solid-state image pickup device 103 (to be referred to as an image pickup device herein-after. In this embodiment, on-chip color filters are arranged on the surface of the device) which can photoelectrically convert incident light and perform an electronic shutter operation of reading out signal charges accumulated for an arbitrary time, a lens system 101 for imaging object light on the surface of the image pickup device 103, an optical filter 102 arranged on the optical path between the lens system 101 and the image pickup device 103 and including an optical LPF for removing unwanted high-frequency components and an IR cut filter for removing unwanted infrared components, an image pickup processing unit 104 for amplifying a signal from the image pickup device 103, performing optical black (OB) clamp processing, adjusting the signal level in accordance with the input level range of an A/D conversion unit 105 at the subsequent stage, and outputting the signal to the A/D conversion unit 105, the A/D conversion unit 105 for converting an analog signal input from the image pickup processing unit 104 into a digital signal, a field memory 106 for storing the digitized image data of one field, an image synthesizing unit 107 for synthesizing immediately preceding field image data from the field memory 106 with the image from the image pickup device 103, a frame memory 108 for storing frame image data which is synthesized by the image synthesizing unit 107 during light emission of an electronic flash unit 120, a color processing unit 109 for performing processing in accordance with the color filter array formed on the surface of the image pickup device 3, separating the signal into R, G, and B signals, and outputting these signals, white balance circuits 110r, 110g, and 110b for multiplying the R, G, and B signals output from the color processing unit 109 by a coefficient output from a system controller 116, respectively, to balance the colors, a luminance generation unit 113 for outputting a luminance signal on the basis of the R, G, and B signals from the white balance circuits 110r, 110g, and 110b, a frame memory 115 for storing a luminance signal of one frame and outputting the luminance signal to the system controller 116, a compression coefficient generation unit 114 for outputting a compression coefficient on the basis of a signal from the system controller 116 and the luminance signal, compression units 111r, 111g, and 111b for compressing the R, G, and B signals using the compression coefficient supplied from the compression coefficient generation unit 114 and outputting the signals, a monitor I/F unit (the monitor I/F generally D/A-converts an input digital signal into an analog signal and adds a synchronous signal) 112 for converting the signals from the compression units 111r, 111g, and 111b in accordance with the standard of a display system (e.g., a monitor) and outputting a signal, the system controller 116 for systematically managing the operation of the apparatus, selecting an operation mode, and obtaining various coefficients to be used in calculations, a sensor driving unit 117 for controlling the operation of the image pickup device 103, a light emission control unit 118 for controlling light emission of the electronic flash unit 120, a light emission driving unit 119 for driving the electronic flash unit 120 on the basis of a signal from the light emission control unit 118, and the electronic flash unit (e.g., a xenon electronic flash unit) 120 for irradiating light onto the object.

The operation of the image pickup apparatus having the above arrangement will be described. A normal operation using natural light and an operation in an electronic flash mode which requires auxiliary light emission will be described below.

When the natural light amount is sufficient, and the object image can be appropriately exposed, the normal operation is performed.

Light coming from the object is condensed by the lens system 101. After unwanted high-frequency components and infrared component are removed by the optical filter 102, the light is imaged on the surface of the image pickup device 103. The image pickup device 103 converts the formed object image into an electrical signal, scans the pixels of the image pickup device 103 in accordance with driving signals (various pulses) from the sensor driving unit 117, reads out a video signal, and outputs the video signal to the image pickup processing unit 104. Since the image pickup device 103 performs the electronic shutter operation in units of fields under the control of the sensor driving unit 117, video signals having different accumulation times (short and long accumulation times) are alternately output to the image pickup processing unit 104 in units of fields.

The signal input to the image pickup processing unit 104 is subjected to amplification and OB clamp processing. The signal is converted into a digital signal by the A/D conversion unit 105, and one field image is stored in the field memory 106.

The immediately preceding field image stored in the field memory 106, and the image from the image pickup device 103, which has an accumulation time different from that of the image stored in the image pickup device 103, are simultaneously input to the image synthesizing unit 107. The two images are synthesized into one image having a wide dynamic range and output to the color processing unit 109. In this case, image synthesis means that object images in the same sight (composition) are superposed to form one image. It is different from image synthesis by partially trimming images in the same sight or synthesizing two images in different sights. In actual image pickup processing, however, the two images cannot be simultaneously obtained. Strictly speaking, not images in the same sight but two images which are continuous at a minimum time interval are obtained.

The color processing unit 109 performs color processing in accordance with the on-chip color filter array formed on the surface of the image pickup device 3. The signal is converted into predetermined signal forms, i.e., R, G, and B signals and output. Various known color processing techniques are available in accordance with the type and array of color filters, and in the present invention, an appropriate one of these techniques can be used.

The R, G, and B signals output from the color processing unit 109 are multiplied by a predetermined gain from the system controller 116 by the white balance circuits 110r, 110g, and 110b, respectively, to appropriately balance the colors, and output. The luminance generation unit 113 generates a luminance signal on the basis of the R, G, and B signals from the white balance circuits 110r, 110g, and 110b, stores the luminance signal of one frame, and outputs the luminance signal to the frame memory 115 for outputting the luminance signal to the system controller 116 and the compression coefficient generation unit 114 for generating and outputting a compression coefficient on the basis of a signal from the system controller 116 and the luminance signal. More specifically, for dynamic range compression/conversion processing of adjusting the synthesized image having a wider dynamic range in accordance with the dynamic range of the display system (monitor; not shown), the system controller 116 calculates a compression coefficient on the basis of the luminance signal from the frame memory 115 and outputs the compression coefficient to the compression coefficient generation unit 114.

The compression units 111r, 111g, and 111b perform dynamic range compression/conversion processing such that the images with the wider dynamic ranges from the white balance circuits 110r, 110g, and 110b are adjusted in accordance with the dynamic range of the display system, and output the images to the monitor I/F unit 112, respectively. The monitor I/F unit 112 converts the input digital signals into analog signals by an internal D/A converter to output the images in a form conforming to the standard of the display system, and then adds a synchronous signal and outputs the signal.

The system controller 116 is constituted by an operation unit such as a keyboard serving as a user interface, a CPU for managing the operation mode of the image pickup apparatus in accordance with setting of the operation unit, and the like. In the normal operation mode for picking up an image only with natural light, an object image having a wide dynamic range obtained by the above-described operation is displayed on the display system.

When the object image is dark because of a short amount of natural light, and illumination light is necessary for obtaining appropriate exposure, a electronic flash unit is caused to emit light to pick up the image. This operation will be described below.

The system controller 116 outputs a light emission enable signal to the light emission control unit 118 in accordance with setting of the operation unit of the image pickup apparatus.

Upon receiving the light emission enable signal, the light emission control unit 118 generates an electronic flash lamp driving pulse for controlling the light emission amount and timing of the electronic flash unit 120 on the basis of, of various pulses from the sensor driving unit 117, the vertical blanking signal and the timing signal for the electronic shutter operation of the image pickup device 103, and outputs the electronic flash lamp driving pulse to the light emission driving unit 119.

In this embodiment, e.g., a xenon electronic flash unit is used as the electronic flash unit 120. The electronic flash unit is driven by the light emission driving unit 119 to irradiate light onto the object.

Figure 16:
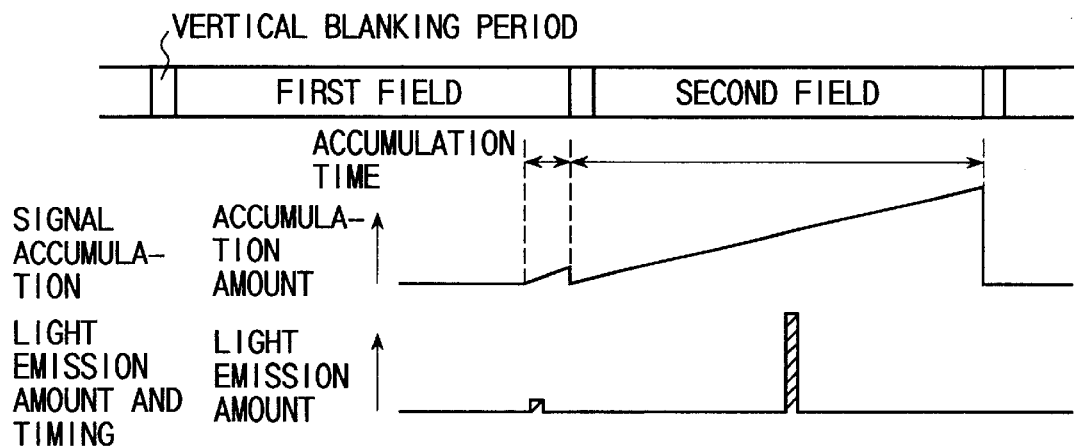
FIG. 16 is a view showing an electronic flash timing and light amount so as to explain the operation of the image pickup apparatus shown in FIG. 15.

FIG. 16 shows the timing and light amount of light emission of the electronic flash unit 120 in accordance with the electronic flash lamp driving pulse output from the light emission control unit 118 which has received the light emission enable signal in the seventh embodiment.

Referring to FIG. 16, in a field (first field) of two continuous fields, where the electronic shutter operation of the image pickup device 103 is performed to obtain a relatively short signal accumulation time, light emission with a small light emission amount is performed. In a field (second field) where the electronic shutter operation is not performed to obtain a relatively long signal accumulation time, light emission with a large light emission amount is performed. Such light emission control is performed by driving the electronic flash unit 120 by the light emission driving unit 119 in accordance with the electronic flash lamp driving pulse output from the light emission control unit 118. The above expression "the electronic shutter operation" means that charges accumulated until an arbitrary time (which is shorter than one field) after the charges accumulated within an arbitrary time of the accumulation one field of the image pickup device are cleared are read out as a signal. This expression will be used in this sense hereinafter.

Video signals output from the image pickup device 103 during light emission of the electronic flash unit 120 are subjected to the same processing as in the normal operation mode, synthesized into one image having a wide dynamic range by the image synthesizing unit 107, and stored in the frame memory 108.

For the subsequent frame images picked up during light emission of the electronic flash unit 120, the image having the wide dynamic range obtained during light emission of the electronic flash unit 120 and stored in the frame memory 108 is output to the color processing unit 109. The image having the wide dynamic range obtained during light emission of the electronic flash unit 120 is displayed on the display system as a still image.

According to this embodiment, even when short-time light emission (flash) of the electronic flash unit 120 is used as a light source, two images having different exposure amounts can be obtained, i.e., an image with a small exposure amount can be obtained for the short signal accumulation time of the image pickup device 103, and an image with a large exposure amount can be obtained for the long signal accumulation time. Since the two images can be appropriately synthesized by the image synthesizing unit 107, an image having a wide dynamic range can be obtained.

An image pickup apparatus according to the eighth embodiment will be described next. The eighth embodiment is a modification of the seventh embodiment and has the same arrangement as in FIG. 15 except a function to be described below.

Figure 17:
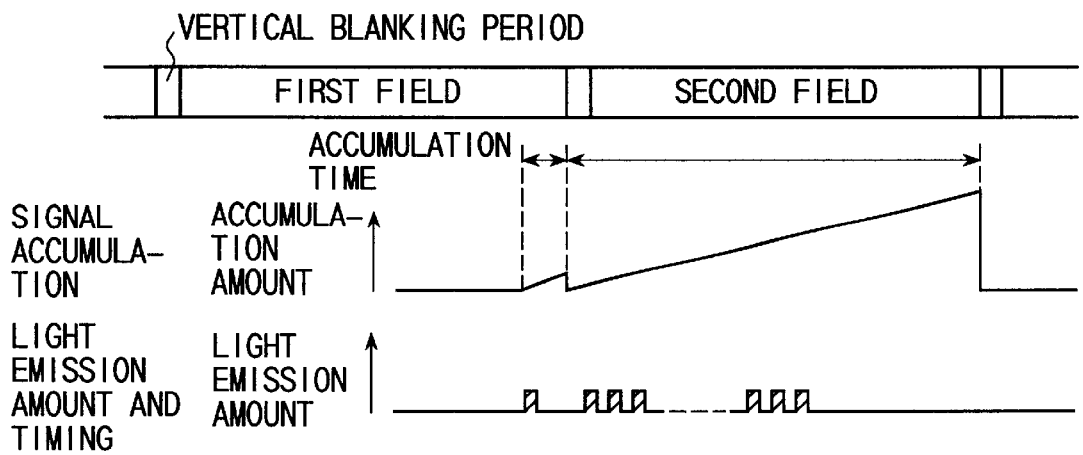
FIG. 17 is a view showing an electronic flash timing and light amount so as to explain the operation of an image pickup apparatus according to the eighth embodiment.

FIG. 17 shows the timing and light amount of light emission of an electronic flash unit 120 in accordance with an electronic flash lamp driving pulse output from a light emission control unit 118 which has received a light emission enable signal from a system controller 116.

As shown in FIG. 17, in a field (first field) of two continuous fields, where the electronic shutter operation of an image pickup device 103 is performed to obtain a relatively short signal accumulation time, light emission with a predetermined light emission amount is performed. In a field (second field) where the electronic shutter operation is not performed to obtain a relatively long signal accumulation time, light emission with a predetermined light emission amount is continuously performed. Such light emission control is performed by driving the electronic flash unit 120 by a light emission driving unit 119 in accordance with the electronic flash lamp driving pulse output from the light emission control unit 118.

According to the operation of the eighth embodiment, even when short-time light emission of the electronic flash unit 120 is used as a light source in the photographing operation, an image with a relatively small exposure amount can be obtained for the above-described relatively short signal accumulation time of the image pickup device 103, and an image with a relatively large exposure amount is obtained for the above-described relatively long signal accumulation time. Since the two images with different exposure amounts can be obtained, the two images can be appropriately synthesized by an image synthesizing unit 107, so that an image having a wide dynamic range can be obtained.

An image pickup apparatus according to the ninth embodiment will be described below. The ninth embodiment is another modification of the seventh embodiment and has the same arrangement as in FIG. 15 except a function to be described below.

Figure 18:
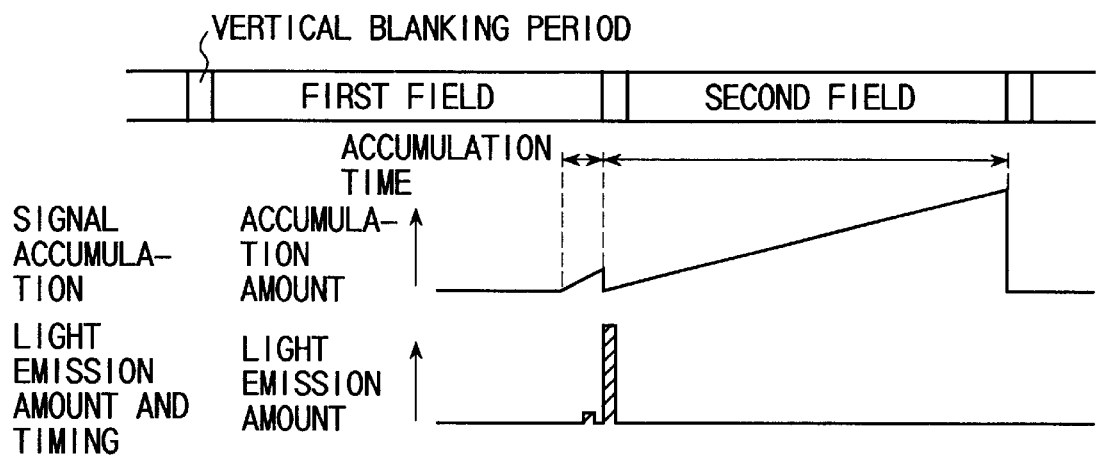
FIG. 18 is a view showing an electronic flash timing and light amount so as to explain the operation of an image pickup apparatus according to the ninth embodiment.

FIG. 18 shows the timing and light amount of light emission of an electronic flash unit 120 in accordance with an electronic flash lamp driving pulse output from a light emission control unit 118 which has received a light emission enable signal from a system controller 116.

As shown in FIG. 18, in a field (first field) of two continuous fields, where the electronic shutter operation of an image pickup device 103 is performed to obtain a relatively short signal accumulation time, light emission with a small light emission amount is performed in the second half of this signal accumulation time. In a field (second field) where the electronic shutter operation is not performed to obtain a relatively long signal accumulation time, light emission with a large light emission amount is continuously performed in the first half of this signal accumulation time. That is, in this embodiment, the interval between the two light-emitting operations is set to be shorter than that of the other embodiments. In this embodiment as well, such light emission control is performed by driving the electronic flash unit 120 by a light emission driving unit 119 in accordance with the electronic flash lamp driving pulse output from the light emission control unit 118.

According to the operation of the ninth embodiment, even when short-time light emission of the electronic flash unit 120 is used as a light source in the photographing operation, an image with a small exposure amount can be obtained for the above-described relatively short signal accumulation time of the image pickup device 103, and an image with a large exposure amount can be obtained for the above-described relatively long signal accumulation time. Since the two images with different exposure amounts can be obtained, the two images can be appropriately synthesized by an image synthesizing unit 107, so that an image having a wide dynamic range can be obtained.

Even when the object moves during the light-emitting interval, the difference between the two images is small because the light-emitting interval of the electronic flash unit 120 is small. Therefore, an image with a minimum shift can be obtained by synthesizing the two images.

An image pickup apparatus according to the 10th embodiment will be described next.

The 10th embodiment is still another modification of the seventh embodiment and has the same arrangement as in FIG. 15 except a function to be described below.

Figure 19:
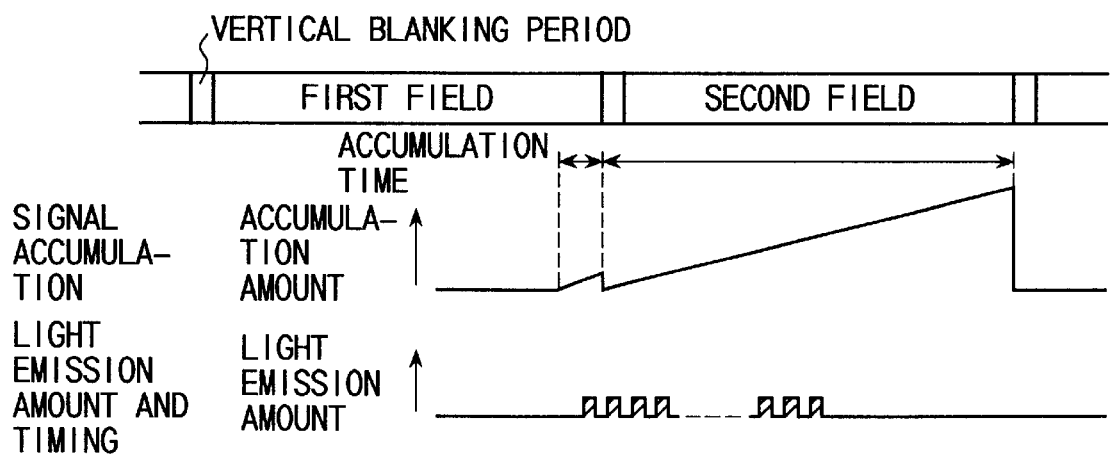
FIG. 19 is a view showing an electronic flash timing and light amount so as to explain the operation of an image pickup apparatus according to the 10th embodiment.

FIG. 19 shows the timing and light amount of light emission of an electronic flash unit 120 in accordance with an electronic flash lamp driving pulse output from a light emission control unit 118 which has received a light emission enable signal from a system controller 116.

As shown in FIG. 19, light emission with a predetermined light emission amount is continuously repeatedly performed in two continuous fields from a point near the end of the relatively short signal accumulation time in a field (first field) where the electronic shutter operation of an image pickup device 103 is performed to a point near the start of the relatively long signal accumulation time in a field (second field) where the electronic shutter operation is not performed. In this embodiment as well, such light emission control is performed by driving the electronic flash unit 120 by a light emission driving unit 119 in accordance with the electronic flash lamp driving pulse output from the light emission control unit 118.

With the above operation, even when short-time light emission of the electronic flash unit 120 is used, an image with a small exposure amount can be obtained for the relatively short signal accumulation time of the image pickup device 103, and an image with a large exposure amount can be obtained for the relatively long signal accumulation time. Since the two images with different exposure amounts can be obtained, the two images can be appropriately synthesized by an image synthesizing unit 107, so that an image having a wide dynamic range can be obtained.

Even when the object moves during the light-emitting interval, the difference between the two images is small because the light-emitting interval of the electronic flash unit 120 is small. Therefore, an image with a minimum shift can be obtained by synthesizing the two images.

An image pickup apparatus according to the 11th embodiment will be described below.

The 11th embodiment is still another modification of the seventh embodiment and has the same arrangement as in FIG. 15 except a function to be described below.

In this embodiment, the timing and light amount of light emission of an electronic flash unit 120 are controlled in the following manner in accordance with an electronic flash lamp driving pulse output from a light emission control unit 118 which has received a light emission enable signal from a system controller 116. The light amount ratio (the ratio of areas of hatched portions shown in FIGS. 16 to 19 and FIG. 23) between light emission with a small light emission amount, which is performed in a field (first field) of two continuous fields, where the electronic shutter operation of an image pickup device 103 is performed to obtain a relatively short signal accumulation time, and light emission with a large light emission amount, which is performed in a field (second field) where the electronic shutter operation is not performed to obtain a relatively long signal accumulation time is set to equal the ratio of the short signal accumulation time to the long signal accumulation time of the image pickup device 103.

Alternatively, the ratio of the number of times of light-emitting operations with a predetermined light amount, which are performed in a field (first field) of two continuous fields where the electronic shutter operation of the image pickup device 103 is performed to obtain a relatively short signal accumulation time, to the number of times of light-emitting operations with a predetermined light emission amount, which are performed in a field (second field) where the electronic shutter operation is not performed to obtain a relatively long signal accumulation time is set to equal the ratio of the relatively short signal accumulation time to the relatively long signal accumulation time of the image pickup device 103.

In this embodiment, with the above operation, even when short-time light emission of the electronic flash unit 120 is used as a light source, an image with a small exposure amount can be obtained for the relatively short signal accumulation time of the image pickup device 103, and an image with a large exposure amount can be obtained for the relatively long signal accumulation time. Since the two images with different exposure amounts can be obtained, the two images can be appropriately synthesized by an image synthesizing unit 107, so that an image having a wide dynamic range can be obtained.

In addition, two images are obtained from the object at which light irradiated by the electronic flash unit 120 arrives (the exposure amount depends on the amount of the illumination light emission) and the background at which light irradiated by the electronic flash unit 120 does not arrive (the exposure amount depends on the signal accumulation time) such that the ratio of the exposure amounts equals the ratio of the signal accumulation times of the image pickup device 103. For this reason, for both the object and the background, an image having an appropriate and wide dynamic range can be obtained.

Figure 20:
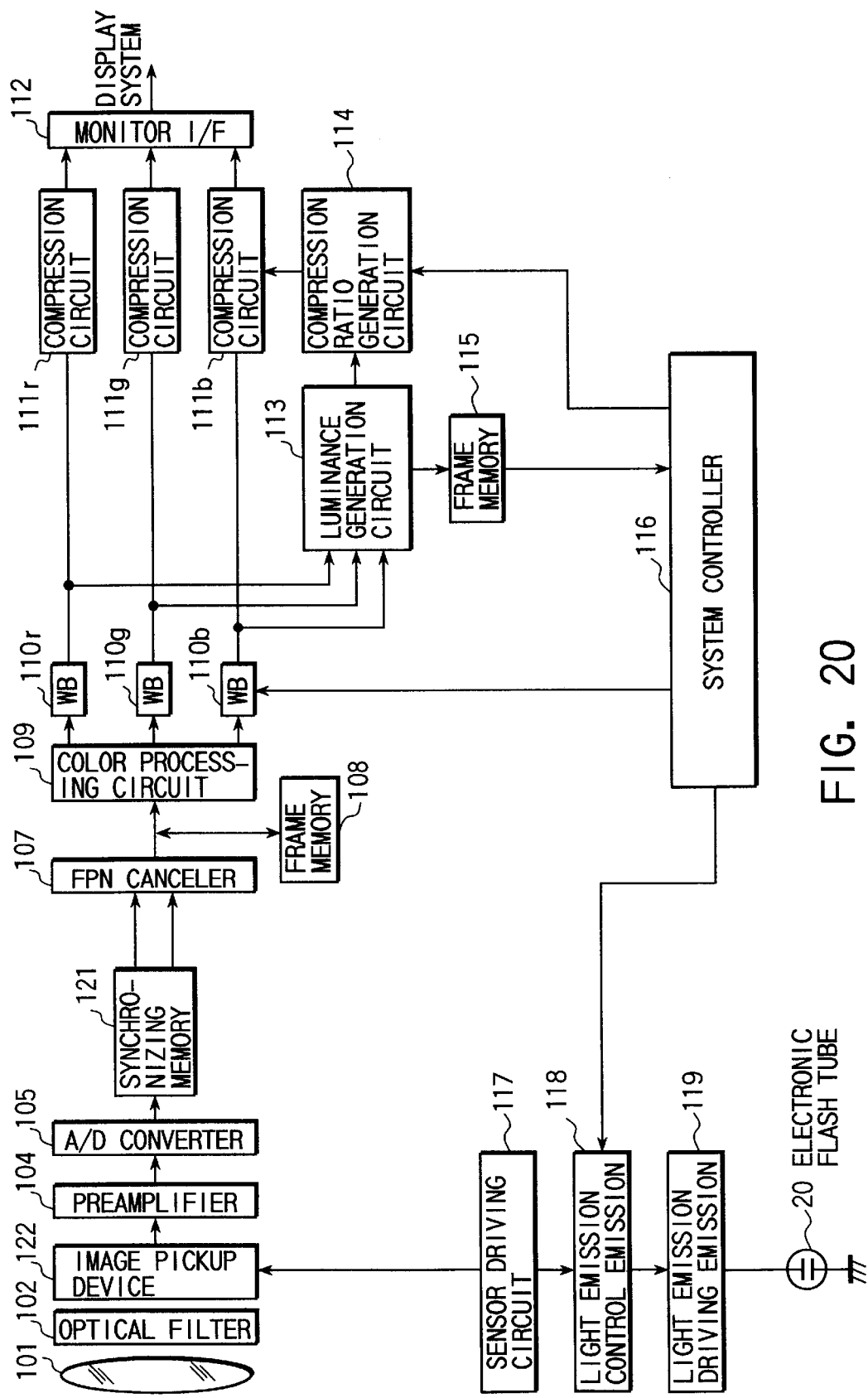
FIG. 20 is a block diagram showing the arrangement of an image pickup apparatus according to the 11th embodiment of the present invention.

FIG. 20 shows the arrangement of an image pickup apparatus according to the 12th embodiment of the present invention. The same reference numerals as in the seventh embodiment shown in FIG. 15 denote the same parts in the 12th embodiment shown in FIG. 20, and a detailed description thereof will be omitted.

Referring to FIG. 20, a solid-state image pickup device 122 capable of accumulating and outputting signals not only for a normal signal accumulation time but also for the vertical blanking period is used as an image pickup unit for receiving an incident optical image and photoelectrically converting the image. This image pickup device is described in detail in, e.g., Video Information (July 1995, pp. 14–17).

In place of the field memory 106 shown in FIG. 15, a synchronizing unit 121 for performing synchronization processing (to be described later) for video signals output from the image pickup device 122 shown in FIG. 20 is arranged between an A/D conversion unit 105 and an image synthesizing unit 107.

The operation of the image pickup apparatus having the above arrangement will be described below. A normal operation mode using natural light and an electronic flash mode which requires auxiliary light emission will be described.

When the natural light amount is sufficient, and the object image can be appropriately exposed, the normal operation is performed.

The image pickup device 122 converts an optical image formed by a lens system 101 into an electrical signal, scans the pixels of the image pickup device 122 in accordance with driving signals (various pulses) from a sensor driving unit 117 to read out a video signal, and outputs the video signal to an image pickup processing unit 104. At this time, a signal accumulated for the normal signal accumulation period and a signal accumulated for the vertical blanking period are distributed to the first and second half intervals of one horizontal period, as shown in FIG. 21, and output from the image pickup device 122 to the image pickup processing unit 104 at a data rate twice the normal data rate.

Figure 22:
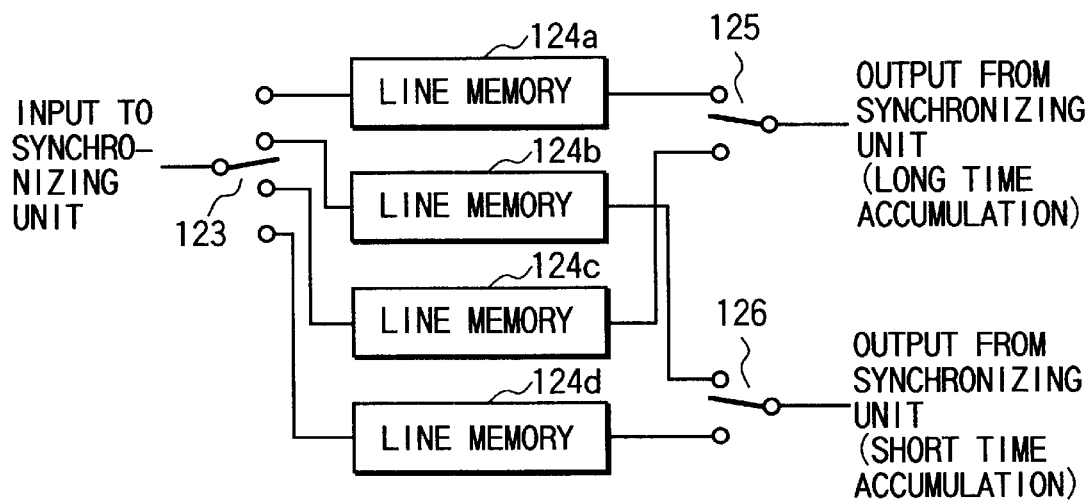
FIG. 22 is a block diagram showing the arrangement of the synchronizing unit of the 12th embodiment.

As shown in FIG. 22, the synchronizing unit 121 is constituted by switches 123, 125, and 126, and four line memories 124a, 124b, 124c, and 124d. The synchronizing unit 121 temporarily stores the video signals having different signal accumulation times and distributed to the first and second half intervals of one horizontal period in the line memories 124a, 124b, 125c, and 124d, respectively, by switching the switch 123. The switch 123 is sequentially circularly switched such that a signal accumulated for the normal signal accumulation period is stored in the line memory 124a in the first half of the first horizontal period, a signal accumulated for the vertical blanking period is stored in the line memory 124b in the second half of the first horizontal period, a signal accumulated for the normal signal accumulation period is stored in the line memory 124c in the first half of the next horizontal period, and a signal accumulated for the vertical blanking period is stored in the line memory 124d in the second half of the next horizontal period.

Figure 21:
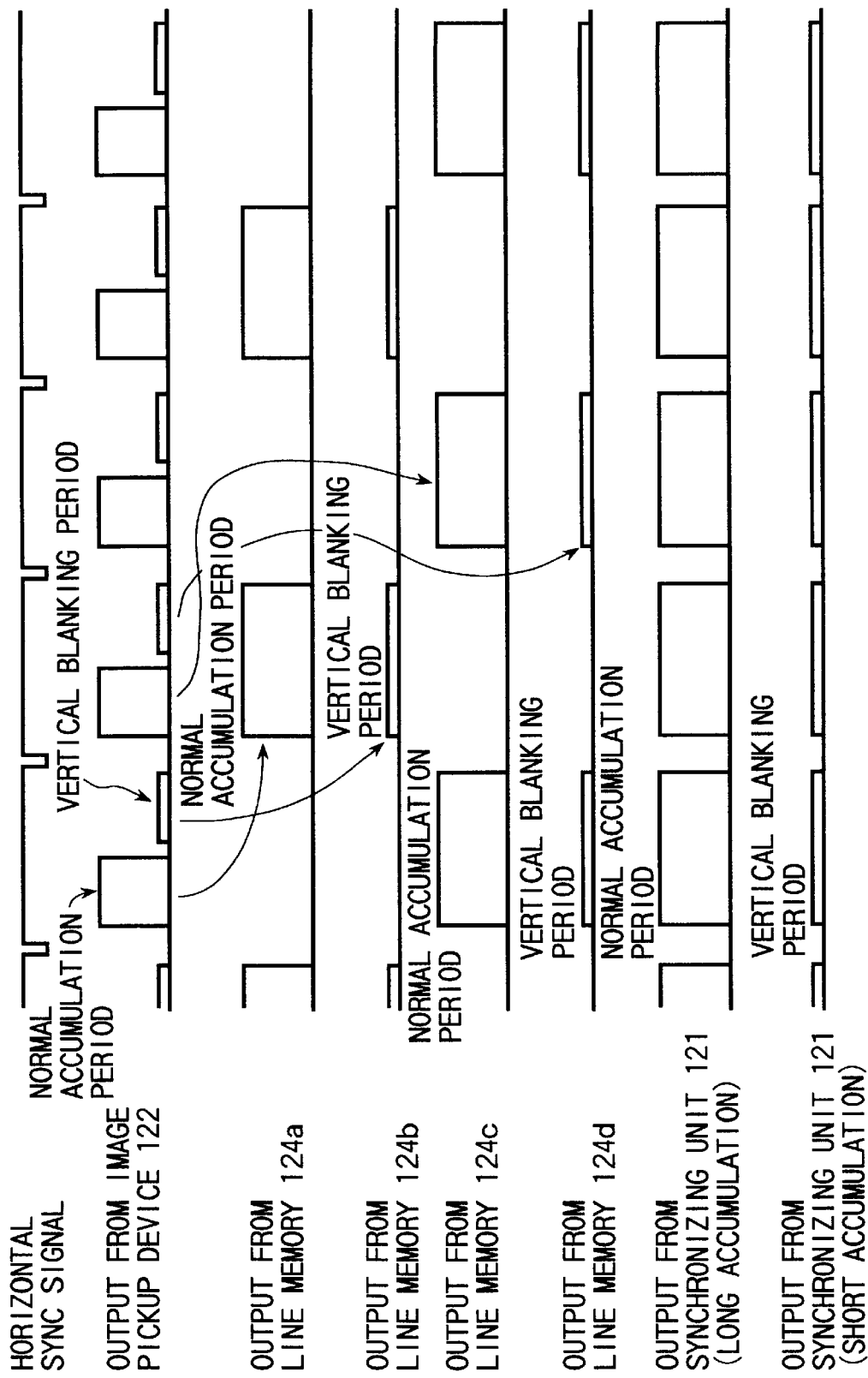
FIG. 21 is a timing chart showing the operation timing according to the output signals from an image pickup device, line memories, and a synchronizing unit in an image pickup apparatus according to the 12th embodiment.

As shown in FIG. 21, the signals accumulated for the normal signal accumulation period are output from the line memories 124a and 124c and the signals accumulated for the vertical blanking period are output from the line memories 124b and 124d within one horizontal period. Each signal is output at the normal data rate as an independent signal delayed by one horizontal period.

For the first horizontal period, the signal accumulated for the long time is output from the line memory 124a, and simultaneously, the signal accumulated for the short time is output from the line memory 124b. For the next horizontal period, the signal accumulated for the long time is output from the line memory 124c, and simultaneously, the signal accumulated for the short time is output from the line memory 124d. These signals are alternately switched by the switches 125 and 126 and simultaneously output to the image synthesizing unit 107 via independent signal lines.

When the object image is dark because of a short amount of natural light, and illumination light is necessary for obtaining appropriate exposure, the image pickup operation is performed while causing the electronic flash unit to emit light. This operation will be described below.

Figure 23:
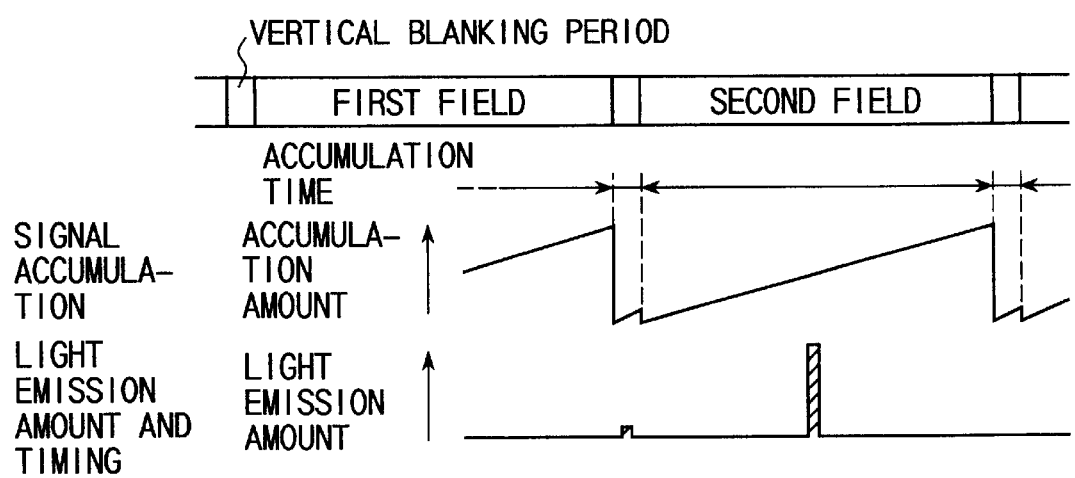
FIG. 23 is a view a view showing an electronic flash timing and light amount so as to explain the operation of the image pickup apparatus according to the 12th embodiment.

FIG. 23 shows the timing and light amount of light emission of the electronic flash unit 120 in accordance with the electronic flash lamp driving pulse output from the light emission control unit 118 which has received a light emission enable signal from a system controller 116.

For the continuous vertical blanking period and normal signal accumulation period, light emission with a small light amount is performed for the vertical blanking period, i.e., the relatively short signal accumulation time of the image pickup device 122, and light emission with a large light amount is performed for the normal signal accumulation period, i.e., the relatively long signal accumulation time. Such control of the light-emitting operation is performed by driving the electronic flash unit 120 by the light emission driving unit 119 in accordance with the electronic flash lamp driving pulse output from the light emission control unit 118.

As described above, according to this embodiment, the known special solid-state image pickup device capable of accumulating signal charges not only for the normal signal accumulation period but also for the vertical blanking period is used as the image pickup device 122 to be used. When the object is dark, short-time light emission of the electronic flash unit 120 can be used to obtain an image with an appropriate exposure amount. When the short-time light emission of the electronic flash unit 120 is used, an image with a small exposure amount can be obtained for the relatively short signal accumulation time, and an image with a large exposure amount can be obtained for the relatively long signal accumulation time as images to be photoelectrically converted by the image pickup device 122. Since the two images with different exposure amounts can be obtained, the two images can be appropriately synthesized by the image synthesizing unit 107, so that an image having a wide dynamic range can be obtained.

In the arrangement of the 12th embodiment as well, the modifications of the seventh embodiment which are described in the eighth to 11th embodiments can be easily applied to obtain the same effect as described above.

The present invention will be summarized below.

(1) An image pickup apparatus characterized by comprising:

a solid-state image pickup device for photoelectrically converting incident light from an object into an electrical signal and outputting the electrical signal;

an electronic flash tube for irradiating light onto the object; and control means for causing the electronic flash tube to emit light in a vertical blanking period of the solid-state image pickup device.

This invention corresponds to the first and second embodiments.

With this arrangement, even when an X-Y address type solid-state image pickup device such as a CMD and a short-time light-emitting unit such as an electronic flash unit are used, an appropriate image can be obtained.

(2) An image pickup apparatus characterized by comprising:

a solid-state image pickup device for photoelectrically converting incident light from an object into an electrical signal and outputting the electrical signal;

an electronic flash tube for irradiating light onto the object;

control means for causing the electronic flash tube to emit light in vertical blanking periods of different field periods of the solid-state image pickup device in different light emission amounts; and synthesizing means for synthesizing a plurality of images obtained by exposure based on light emission of the electronic flash tube.

This invention corresponds to the second embodiment.

With this arrangement, even when a light-emitting means such as an electronic flash unit is used, two images with different exposure fields can be obtained from odd and even fields. By synthesizing these images with different exposure amounts, an image having a wider dynamic range can be obtained. Therefore, an image having a wider dynamic range can be obtained with an appropriate exposure amount.

(3) An image pickup apparatus characterized by comprising:

a solid-state image pickup device capable of nondestructively reading out an image signal;

an electronic flash tube for irradiating light onto an object;

first control means for accumulating a signal in the solid-state image pickup device for a first accumulation time and thereafter nondestructively reading out the signal to obtain a first signal;

second control means for accumulating a signal for a second accumulation time longer than the first accumulation time and thereafter reading out the signal to obtain a second image signal; and third control means for causing the electronic flash tube to emit light at an interval equal to or shorter than the first accumulation time.

This invention corresponds to the third embodiment.

With this arrangement, even when both the electronic flash and light (e.g., natural light or fluorescent lamp) other than the electronic flash are necessary, an image having an appropriate and wider dynamic range can be obtained at a moving image rate. (In the arrangement of claim 2, the moving image rate lowers to ½ because one frame is constituted by two fields).

(4) An apparatus according to (2) or (3), characterized in that the synthesizing means comprises detection means for detecting a light emission amount of the light-emitting means, and correction means for correcting a video signal obtained from the image pickup means on the basis of the signal detected by the detection means.

(5) An apparatus according to (2) or (3), characterized in that the detection means detects variations in light emission amount on the basis of the signal from the image pickup means.

(6) An apparatus according to (2) or (3), characterized in that the detection means comprises a light-emitting device for receiving the light from the object and converting the light into the electrical signal.

This invention corresponds to the fourth and fifth embodiments.

With this arrangement, an error in exposure amount due to variations in light emission amounts of two images can be detected, and video signals obtained from the solid-state image pickup means can be corrected on the basis of the detection result before the two images are synthesized. Therefore, a degradation in image due to variations in light emission amount can be prevented.

(7) An apparatus according to (2) or (3), characterized in that the light emission control means is controlled on the basis of an output from a light-receiving device for receiving the light from the object and converting the light into the electrical signal.

This invention correspond to the sixth embodiment.

With this arrangement, the light-emitting means is controlled on the basis of the output from the light-receiving device for receiving the light from the object and converting the light into the electrical signal such that variations in light emission amount are eliminated. Therefore, an appropriate image free from variations in light emission amount can be synthesized.

(8) An image pickup apparatus characterized by comprising:

an image pickup device for obtaining an image signal corresponding to a self image pickup field;

exposure time control means for controlling an effective exposure time for the image pickup device to give effective exposure to the image pickup device during a relatively long first time interval so as to pick up an image of a portion having a relatively low luminance in the image pickup field, and to give effective exposure to the image pickup device during a relatively short second time interval adjacent to the first time interval so as to pick up an image of a portion having a relatively high luminance in the image pickup field;

synthesizing means for synthesizing image data representing one image on the basis of first image signal data and second image signal data so as to represent the image of the portion having the relatively low luminance on the basis of the first image signal data obtained in correspondence with the first time interval for the image pickup device, and to represent the image of the portion having the relatively high luminance on the basis of the second image signal data obtained in correspondence with the second time interval;

flash light-emitting means capable of controlling a light emission form; and light emission control means for controlling the light emission form of the flash light-emitting means so as to prevent a total exposure amount in the second time interval from exceeding that in the first time interval when the flash light-emitting means is caused to emit light for the first and second time intervals.

With this arrangement, even when the exposure amount of the image pickup device depends not on the exposure time but on the light emission amount of the flash light-emitting means, two images with different exposure amounts can be obtained, i.e., an image with a large exposure amount can be obtained in the first time interval of the image pickup device, and an image with a small exposure amount can be obtained in the second time interval. Therefore, an image having an appropriate and wide dynamic range can be obtained by the image synthesizing means.

(9) An apparatus according to (8), characterized in that the light emission control means controls the light emission form so as to select a ratio of light emission amounts between light emission of the flash light-emitting means in the first time interval and that in the second time interval in correspondence with a ratio of the first time interval to the second time interval.

With this arrangement, even when the exposure amount of the image pickup device depends not on the exposure time but on the light emission amount of the flash light-emitting means, two images with different exposure amounts can be obtained, i.e., an image with a large exposure amount can be obtained in the first time interval of the image pickup device, and an image with a small exposure amount can be obtained in the second time interval. Therefore, an image having an appropriate and wide dynamic range can be obtained by the image synthesizing means. In addition, two images are obtained from the object at which light of the flash light-emitting means arrives (the exposure amount depends on the light emission amount of the flash light-emitting means) and the background at which light does not arrive (the exposure amount depends on the exposure time) such that the ratio of the exposure amounts equals the ratio of the first time interval to the second time interval. For this reason, for both the object and the background, an image having an appropriate and wide dynamic range can be obtained by the image synthesizing means.

(10) An apparatus according to (8) or (9), characterized in that the light emission control means controls an exposure amount of light emission by controlling a light emission amount per unit time for each light emission of the flash light-emitting means.

With this arrangement, even when the exposure amount of the image pickup device depends not on the exposure time but on the light emission amount of the flash light-emitting means, two images with different exposure amounts can be obtained, i.e., an image with a large exposure amount can be obtained in the first time interval of the image pickup device, and an image with a small exposure amount can be obtained in the second time interval. Therefore, an image having an appropriate and wide dynamic range can be obtained by the image synthesizing means.

(11) An apparatus according to (8) or (9), characterized in that the light emission control means controls an exposure amount of light emission by controlling a light emission time for each light emission of the flash light-emitting means while setting a predetermined light emission amount per unit time.

With this arrangement, even when the exposure amount of the image pickup device depends not on the exposure time but on the light emission amount of the flash light-emitting means, two images with different exposure amounts can be obtained, i.e., an image with a large exposure amount can be obtained in the first time interval of the image pickup device, and an image with a small exposure amount can be obtained in the second time interval. Therefore, an image having an appropriate and wide dynamic range can be obtained by the image synthesizing means.

(12) An apparatus according to (8) or (9), characterized in that the light emission control means controls an exposure amount of light emission by controlling the number of times of light-emitting operations for each light emission of the flash light emitting means while setting a predetermined light emission amount per unit time.

With this arrangement, even when the exposure amount of the image pickup device depends not on the exposure time but on the light emission amount of the flash light-emitting means, two images with different exposure amounts can be obtained, i.e., an image with a large exposure amount can be obtained in the first time interval of the image pickup device, and an image with a small exposure amount can be obtained in the second time interval. Therefore, an image having an appropriate and wide dynamic range can be obtained by the image synthesizing means.

(13) An apparatus according to (10), (11), or (12), characterized in that the light emission control means controls the light emission form so as to make the flash light-emitting means emit light in a time period of the first time interval, which is close to the second time interval, and in a time period of the second time interval, which is close to the first time interval.

With this arrangement, even when the exposure amount of the image pickup device depends not on the exposure time but on the light emission amount of the flash light-emitting means, two images with different exposure amounts can be obtained, i.e., an image with a large exposure amount can be obtained in the first time interval of the image pickup device, and an image with a small exposure amount can be obtained in the second time interval. Therefore, an image having an appropriate and wide dynamic range can be obtained by the image synthesizing means. In addition, even when the object moves during the light-emitting interval, the difference between the two images is small because the light-emitting interval is small. Therefore, an image with a minimum shift can be obtained by synthesizing the two images.

(14) An apparatus according to (11) or (12), characterized in that the light emission control means controls the light emission form so as to make the flash light-emitting means substantially continuously emit light in a time period of the first time interval, which is close to the second time interval, and in a time period of the second time interval, which is close to the first time interval.

With this arrangement, even when the exposure amount of the image pickup device depends not on the exposure time but on the light emission amount of the flash light-emitting means, two images with different exposure amounts can be obtained, i.e., an image with a large exposure amount can be obtained in the first time interval of the image pickup device, and an image with a small exposure amount can be obtained in the second time interval. Therefore, an image having an appropriate and wide dynamic range can be obtained by the image synthesizing means. In addition, even when the object moves during the light-emitting interval, the difference between the two images is small because the light-emitting interval is small. Therefore, an image with a minimum shift can be obtained by synthesizing the two images.

As has been described above in detail, according to the present invention, an image pickup apparatus can be provided. With this image pickup apparatus, even when an X-Y address type solid-state image pickup device and a light-emitting means are used, an appropriate image can be obtained. Even when short time light emission (flash) is used as a light source in addition to natural light, two images with different exposure amounts can be obtained. By synthesizing these two images, an image having an appropriate and wide dynamic range can be obtained.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An image pickup apparatus comprising:
   an X-Y address type solid-state image pickup means for photoelectrically converting incident light from an object into an electrical signal and outputting the electrical signal;
   an electronic flash means for irradiating light onto said object;
   control means for causing said electronic flash means to emit light in vertical blanking periods of different field periods of said solid-state image pickup means in different light emission amounts; and
   synthesizing means for synthesizing a plurality of images obtained by exposure based on light emission of said electronic flash means;
   wherein said synthesizing means comprises a density connection circuit for synthesizing image data of two frames with different exposure amounts to obtain image data of one frame whose dynamic range is widened.

2. An image pickup apparatus comprising:
- a solid-state image pickup means for nondestructively reading out an image signal;
- an electronic flash means for irradiating light onto an object;
- first control means for accumulating a solid-state image pickup means signal for a first accumulation time and thereafter nondestructively reading out the signal to obtain a first signal;
- second control means for accumulating the solid-state image pickup means signal for a second accumulation time longer than the first accumulation time and thereafter reading out the signal to obtain a second image signal; and
- third control means for causing said electronic flash means to emit light at an interval not longer than the first accumulation time.

3. An apparatus according to claim 1, wherein said synthesizing means comprises:
- detection means for detecting a light emission amount of said electronic flash means, and
- correction means for correcting a video signal obtained from said image pickup means on the basis of the light emission amount detected by said detection means.

4. An apparatus according to claim 2, wherein said synthesizing means comprises:
- detection means for detecting a light emission amount of said electronic flash means, and
- correction means for correcting a video signal obtained from said solid-state image pickup means on the basis of the light emission amount detected by said detection means.

5. An apparatus according to claim 3, wherein said detection means detects variations in light emission amount on the basis of the electrical signal output by said image pickup means.

6. An apparatus according to claim 4, wherein said detection means detects variations in light emission amount on the basis of the solid-state image pickup means signal.

7. An apparatus according to claim 3, wherein said detection means comprises a light-receiving device for receiving the light from said object and converting the light into the electrical signal.

8. An apparatus according to claim 4, wherein said detection means comprises a light-receiving device for receiving the light from said object and converting the light into the solid-state image pickup means signal.

9. An apparatus according to claim 1, wherein said control means operates on the basis of an output from a light-receiving device for receiving the light from said object and converting the light into the electrical signal.

10. An apparatus according to claim 2, wherein said first, second and third control means operate on the basis of an output from a light-receiving device for receiving the light from said object and converting the light into the solid-state image pickup means signal.

11. An image pickup apparatus comprising:
- an image pickup means for obtaining an image signal corresponding to a self image pickup field;
- exposure time control means for controlling an effective exposure time for said image pickup means to give effective exposure to said image pickup means during a relatively long first time interval so as to pick up an image of a portion having a relatively low luminance in said image pickup field, and to give effective exposure to said image pickup means during a relatively short second time interval adjacent to the first time interval so as to pick up an image of a portion having a relatively high luminance in said image pickup field;
- synthesizing means for synthesizing image data representing one image on the basis of first image signal data and second image signal data so as to represent the image of said portion having the relatively low luminance on the basis of the first image signal data obtained in correspondence with the first time interval for said image pickup means, and to represent the image of said portion having the relatively high luminance on the basis of the second image signal data obtained in correspondence with the second time interval;
- flash light-emitting means for controlling a light emission form; and
- light emission control means for controlling the light emission form of said flash light-emitting means so as to prevent a total exposure amount in the second time interval from exceeding that in the first time interval when said flash light-emitting means is caused to emit light for the first and second time intervals, and wherein said light emission control means controls the light emission form so as to select a ratio of light emission amounts between light emission of said flash light-emitting means in the first time interval and that in second time interval, said ratio of light emission amounts being substantially equal to a ratio of the first time interval to the second time interval.

12. An apparatus according to claim 11, wherein said light emission control means controls an exposure amount of light emission by controlling a light emission amount per unit time for each light emission of said flash light-emitting means.

13. An apparatus according to claim 11, wherein said light emission control means controls an exposure amount of light emission by controlling a light emission amount per unit time for each light emission of said flash light-emitting means.

14. An apparatus according to claim 11, wherein said light emission control means controls an exposure amount of light emission by controlling a light emission time for each light emission of said flash light-emitting means while setting a predetermined light emission amount per unit time.

15. An apparatus according to claim 11, wherein said light emission control means controls an exposure amount of light emission by controlling a light emission time for each light emission of said flash light-emitting means while setting a predetermined light emission amount per unit time.

16. An apparatus according to claim 11, wherein said light emission control means controls an exposure amount of light emission by controlling the number of times of light-emitting operations for each light emission of said flash light-emitting means while setting a predetermined light emission amount per unit time.

17. An apparatus according to claim 11, wherein said light emission control means controls an exposure amount of light emission by controlling the number of times of light-emitting operations for each light emission of said flash light-emitting means while setting a predetermined light emission amount per unit time.

18. An apparatus according to claim 12, wherein said light emission control means controls the light emission form so as to make said flash light-emitting means emit light in a time period of the first time interval, which is close to the second time interval, and in a time period of the second time interval, which is close to the first time interval.

19. An apparatus according to claim 13, wherein said light emission control means controls the light emission form so as to make said flash light-emitting means emit light in a time period of the first time interval, which is close to the second time interval, and in a time period of,the second time interval, which is close to the first time interval.

20. An apparatus according to claim 14, wherein said light emission control means controls the light emission form so as to make said flash light-emitting means emit light in a time period of the first time interval, which is close to the second time interval, and in a time period of the second time interval, which is close to the first time interval.

21. An apparatus according to claim 13, wherein said light emission control means controls the light emission form so as to make said flash light-emitting means substantially continuously emit light in a time period of the first time interval, which is close to the second time interval, and in a time period of the second time interval, which is close to the first time interval.

22. An apparatus according to claim 14, wherein said light emission control means controls the light emission form so as to make said flash light-emitting means substantially continuously emit light in a time period of the first time interval, which is close to the second time interval, and in a time period of the second time interval, which is close to the first time interval.

* * * * *